(12) United States Patent
Minasian et al.

(10) Patent No.: US 12,373,950 B1
(45) Date of Patent: Jul. 29, 2025

(54) TRAINING AND UTILIZING MACHINE LEARNING MODELS TO GENERATE PERTURBATION EMBEDDINGS FROM PHENOMIC IMAGES OF CELLS, INCLUDING NEURONAL CELL IMAGES

(71) Applicant: Recursion Pharmaceuticals, Inc., Salt Lake City, UT (US)

(72) Inventors: Arin Minasian, Toronto (CA); Conor Austin Forsman Tillinghast, Salt Lake City, UT (US); Jordan Michael Sorokin, Fort Collins, CO (US); Kelly Anne Zalocusky, Belfair, WA (US); Marta Marie Fay, Salt Lake City, UT (US); Maryam Fallah, Toronto (CA); Mohammadsadegh Saberian, Kitchener (CA)

(73) Assignee: Recursion Pharmaceuticals, Inc., Salt Lake City, UT (US)

( * ) Notice: Subject to any disclaimer, the term of this patent is extended or adjusted under 35 U.S.C. 154(b) by 0 days.

(21) Appl. No.: 19/174,414

(22) Filed: Apr. 9, 2025

Related U.S. Application Data

(60) Provisional application No. 63/632,861, filed on Apr. 11, 2024.

(51) Int. Cl.
*G16B 45/00* (2019.01)
*G06N 20/00* (2019.01)
*G06T 7/00* (2017.01)

(52) U.S. Cl.
CPC .......... *G06T 7/0012* (2013.01); *G06N 20/00* (2019.01); *G06T 2207/20081* (2013.01); *G06T 2207/30024* (2013.01)

(58) Field of Classification Search
None
See application file for complete search history.

(56) References Cited

U.S. PATENT DOCUMENTS 10,769,501 B1 * 9/2020 Ando .................. G06V 30/274
2020/0362334 A1 * 11/2020 Regev .................. C12N 15/113
2024/0029868 A1 * 1/2024 Gulsun .................. G16H 50/20

* cited by examiner

*Primary Examiner* — Nancy Bitar
(74) *Attorney, Agent, or Firm* — Keller Preece PLLC

(57) ABSTRACT

The present disclosure relates to systems, non-transitory computer-readable media, and methods that train and utilize machine learning models to generate perturbation embeddings from phenomic images of cells, including neuronal cell images. Indeed, in one or more implementations, the disclosed systems generate a perturbation embedding using an adapter model or a mixture of experts model. In some implementations, the disclosed systems utilize a mixture of experts model that combines phenomic embeddings from different embedding models to generate a mixture of experts phenomap that contains information from multiple embedding models.

20 Claims, 13 Drawing Sheets

TRAINING AND UTILIZING MACHINE LEARNING MODELS TO GENERATE PERTURBATION EMBEDDINGS FROM PHENOMIC IMAGES OF CELLS, INCLUDING NEURONAL CELL IMAGES

CROSS-REFERENCE TO RELATED APPLICATIONS

This application claims the benefit of, and priority to, U.S. Provisional Application No. 63/632,861, entitled "TRAINING AND UTILIZING MACHINE LEARNING MODELS TO GENERATE PERTURBATION EMBEDDINGS FROM PHENOMIC IMAGES OF CELLS, INCLUDING NEURONAL CELL IMAGES, filed Apr. 11, 2024, the contents of which are incorporated by reference herein in their entirety.

BACKGROUND

Recent years have seen significant developments in hardware and software platforms for training and utilizing machine learning models for classifying images. For example, conventional systems utilize large volumes of training data to teach machine learning models to generate intelligent classifications corresponding to various cell types. Despite these recent advances, conventional systems suffer from a number of technical deficiencies, particularly with regard to accuracy, efficiency, and operational inflexibility in implementing machine learning technologies. These deficiencies are particularly profound in the image analysis of neuronal cells.

SUMMARY

Embodiments of the present disclosure provide benefits and/or solve one of the foregoing or other problems in the art with systems, non-transitory computer-readable media, and methods that utilize a mixture of experts model to generate a mixture of experts phenomap from mixture of experts phenomic embeddings. For example, the disclosed systems can use a first embedding model to generate a first phenomic embedding and a second embedding model to generate a second phenomic embedding. Further, the disclosed systems can use a mixture of experts model to combine the first phenomic embedding and the second phenomic embedding to generate a mixture of experts phenomic embedding. Specifically, the disclosed system can generate the mixture of experts phenomics embedding by combining the first phenomic embedding and the second phenomic embedding according to mixture of experts combination weights. To illustrate, the disclosed systems can determine the mixture of experts combination weights according to factors such as benchmarking measures and phenoprint rates of the first embedding model and the second embedding model. Additionally, the disclosed systems can combine the mixture of experts phenomic embedding with additional mixture of experts phenomic embeddings to generate a mixture of experts phenomap.

BRIEF DESCRIPTION OF THE DRAWINGS

The detailed description provides one or more embodiments with additional specificity and detail through the use of the accompanying drawings, as briefly described below.

DETAILED DESCRIPTION

Figure 1:
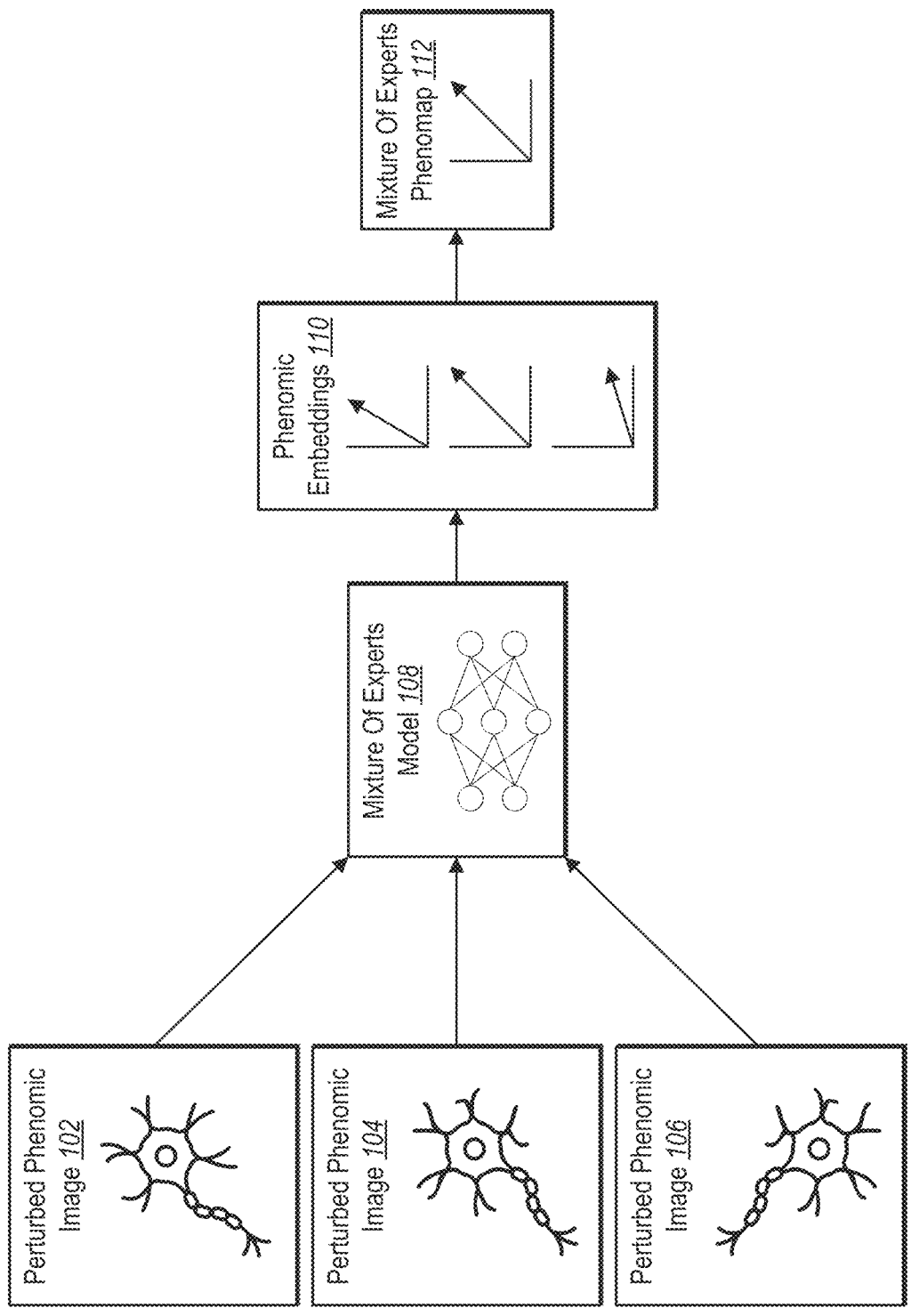
FIG. 1 illustrates an overview of a perturbation embedding system utilizing a mixture of experts model to generate a mixture of experts phenomap in accordance with one or more embodiments.

Embodiments of the present disclosure provide benefits and/or solve one or more of the foregoing or other problems in the art with systems, non-transitory computer-readable media, and methods of a framework that trains and utilizes machine learning models to generate perturbation embeddings from phenomic images of cells, including neuronal cell images. For example, a perturbation embedding system can utilize a mixture of experts model to generate a mixture of experts phenomap from phenomic embeddings. The perturbation embedding system can utilize a first embedding model and a second embedding model of a mixture of experts model to generate a first phenomic embedding and a second phenomic embedding from a perturbed phenomic image. The perturbation embedding system can determine mixture of experts combination weights according to a variety of factors and can generate a mixture of experts phenomic embedding according to the mixture of experts combination weights. In this manner, the perturbation embedding system can generate a mixture of experts phenomap as a feature space that provides information about a perturbation depicted in the perturbed phenomic image (e.g., a perturbation applied to a group of cells).

Moreover, in one or more embodiments, the perturbation embedding system can determine benchmarking measures from phenomic embeddings the system generates. The perturbation embedding system can utilize the benchmarking measures to determine an accuracy level (e.g., according to a threshold level) of the phenomic embeddings. Additionally, the perturbation embedding system can determine a rate of statistical significance of the phenomic embeddings and utilize the rate of statistical significance to determine a phenoprint rate for the phenomic embeddings. Based on the benchmarking measure and/or the phenoprint rate, the perturbation embedding system can determine mixture of experts combination weights for the phenomic embeddings and combine the phenomic embeddings according to the mixture of experts combination weights to generate a mixture of experts phenomic embedding according to the mixture of experts combination weights.

Additionally, in one or more embodiments, the perturbation embedding system can train a first phenomic embedding model utilizing a first number of samples (e.g., segments) of a perturbed phenomic image having a first resolution. Further, the perturbation embedding system can train a second phenomic embedding model utilizing a second number of samples (e.g., segments) of a perturbed phenomic image having a second resolution. The perturbation embedding system can generate a first set of segment embeddings from the first number of samples and a second set of segment embeddings from the second number of samples. Further, the perturbation embedding system can utilize an attention mechanism to aggregate the first set of segment embeddings and the second set of segment embeddings to generate a first phenomic embedding and a second phenomic embedding, respectively. Moreover, the perturbation embedding system can combine the first phenomic embedding and the second phenomic embedding to generate a mixture of experts phenomic embedding.

As illustrated in FIG. 1, the perturbation embedding system 100 can identify a plurality of perturbed phenomic images (e.g., a perturbed phenomic image 102, a perturbed phenomic image 104, and a perturbed phenomic image 106). In some embodiments, the perturbation embedding system 100 can generate the plurality of perturbed phenomic images by applying a perturbation (e.g., such as a gene knockout) to a well of cells and generate the plurality of perturbed phenomic images by capturing images (e.g., digital images) of the well of cells after the perturbation has been applied.

The perturbation embedding system 100 can provide the plurality of perturbed phenomic images to a mixture of experts model 108. The mixture of experts model 108 can include a plurality of embedding models, such as a masked auto-encoder model, a balanced supervised contrastive learning model, or another machine learning model (e.g., classification model). The plurality of embedding models can also include machine learning models having the same type or architecture but trained in different data sets. Based on the mixture of experts model 108 receiving the plurality of perturbed phenomic images, the perturbation embedding system 100 can cause each of the plurality of embedding models to generate phenomic embeddings 110 from the plurality of perturbed phenomic images. The perturbation embedding system 100 can combine the phenomic embeddings 110 to generate a mixture of experts phenomap 112. Indeed, the perturbation embedding system 100 can utilize the mixture of experts phenomap 112 to store information relating to the perturbations applied to the cells (e.g., to generate the plurality of perturbed phenomic images).

In some embodiments, the perturbation embedding system 100 can combine the phenomic embeddings 110 to generate a mixture of experts phenomic embedding. Further, the perturbation embedding system 100 can utilize the mixture of experts model 108 to generate a first mixture of experts phenomic embedding from the phenomic embeddings. Additionally, the perturbation embedding system 100 can generate an additional mixture of experts phenomic embedding from an additional perturbed phenomic image that depicts an additional perturbation (e.g., a different perturbation than the perturbed phenomic image 102, the perturbed phenomic image 104, and/or the perturbed phenomic image 106 depict). The perturbation embedding system 100 can combine the mixture of experts phenomic embedding and the additional mixture of experts phenomic embedding to generate the mixture of experts phenomap 112.

In some embodiments, the perturbation embedding system 100 can utilize mixture of experts combination weights to combine the phenomic embeddings 110 to generate the mixture of experts phenomic embedding. Indeed, the perturbation embedding system 100 can determine the mixture of experts combination weights such that the perturbation embedding system 100 accurately represents different aspects of models of the mixture of experts model 108 in the mixture of experts phenomic embedding, and therefore also in the mixture of experts phenomap 112. The perturbation embedding system 100 can determine the mixture of experts combination weights according to a variety of factors, such as samples used to train models within the mixture of experts model 108 (discussed below with regard to FIG. 4), or various metrics the perturbation embedding system 100 uses to determine an accuracy of the phenomic embeddings, such as benchmarking measures (discussed below with regard to FIG. 5) or phenoprint rates (discussed below with regard to FIG. 6)

Additionally, in some embodiments, the perturbation embedding system 100 can train and use a perturbation embedding model to generate a perturbation vector. Specifically, the perturbation embedding system 100 can utilize a control encoder and a perturbation encoder to generate a background vector from a background phenomic image and a perturbation vector from a perturbed phenomic image. The perturbation embedding system 100 can further determine a batch vector from a combination of the background vector and the perturbation vector. More information regarding the perturbation embedding model can be found below with regard to FIGS. 9A, 9B, and 10.

As mentioned previously, conventional systems suffer from a number of technical deficiencies, particularly with regard to accuracy, efficiency, and operational inflexibility of implementing computing devices. For example, conventional systems often generate inaccurate machine learning predictions. Indeed, although conventional system can utilize machine learning models to generate some biological predictions, such predictions are often inaccurate because conventional systems often fail to account for the varied and complex nature of cell physiology, especially with regard to neuronal cells. Thus, conventional systems often generate predictions for effects of perturbation to the cells without accounting for the complex and highly differentiated physiology of nerve cells (e.g., the predictions at inference are based on insufficient data), leading to generation of inaccurate predictions. Other factors that can lead to inaccurate predictions are naturally occurring variations in cell populations that are unrelated to the perturbation, and batch-specific variations in the cell populations (e.g., inherent in the process of differentiating neuronal cells from pluripotent stem cells).

Furthermore, conventional systems are often inefficient. For example, conventional systems often fail to account for irregular plating patterns of cells, such as neuronal cells. Neuronal cells often present in high concentrations in small areas of the plate, as opposed to the more uniform distributions of other biological cells. In addition to the irregular plating, there are portions of the neuronal cells, such as the synapses, that are very small even by microscopic standards but that contain highly relevant information. As such, conventional systems waste a significant amount of computational resources analyzing irrelevant portions of phenomic images of neuronal cells. Moreover, the irregular plating patterns and very small areas containing high amounts of information create significant noise that, in addition to making conventional systems inefficient, also contributes significantly to the inaccuracies mentioned above.

Moreover, conventional systems often require excessive time, resources, user interactions, processes, and user interfaces to analyze the efficacy or accuracy of machine learning models. To illustrate, conventional systems can utilize implementing computing devices to employ a testing protocol for comparing predictions to measured results. Such systems can generate testing results and provide such results for display via a series of user interfaces or different models and different experimental targets. Such systems require excessive time, computing resources (e.g., processing power and memory) to establish and implement such processes as well as to provide and navigate through user interfaces to identify and act on pertinent information. In addition, conventional systems often implement training operations that require significant training resources, such as paired matching for training.

Conventional systems are also operationally inflexible. Indeed, as mentioned above conventional systems are rigidly trained on a single cell representation. Accordingly, conventional systems are often unable to distinguish between perturbation impacts and other confounding effects corresponding to a particular experiment or cellular analysis. Furthermore, conventional systems are often unable to flexibly analyze different cell types. Accordingly, conventional systems are rigidly limited to a particular cell and unable to analyze atypical cells of varied shapes, such as neural cells.

As discussed above, conventional systems that utilize machine learning models to generate embeddings face a variety of challenges. Because these challenges deal with utilizing machine learning to generate embeddings of perturbations, they are inherently technical in nature. Indeed, conventional systems face numerous challenges in performing tasks such as generating and/or utilizing embeddings from machine learning models. These challenges are further highlighted when it comes to generating embeddings of perturbations applied to atypical cell types, such as nerve cells for several reasons, including a scarcity of training data for atypical cell types, as well as complex cell morphology for atypical cell types.

In addition, there are several problems within the technical field of drug discovery. Discovering new drugs (e.g., new compounds for use in treatment of sicknesses and/or diseases, etc.) is an expensive, time consuming, inefficient process that requires repetitive, often wasteful experimentation to identify a single lead compound (e.g., a compound with potential applications for treatment of illness/disease) from among tens of thousands, if not more, potential candidates.

The perturbation embedding system 100 can provide a variety of improvements relative to conventional systems through a mixture of experts model. For example, as previously mentioned, conventional systems require significant training resources, such as paired matching. This makes the training process computationally expensive for conventional systems. In contrast, the perturbation embedding system 100 can utilize unsupervised training methods, such as a masked auto-encoder. Moreover, the perturbation embedding system 100 can combine pre-trained models to generate improved perturbation embeddings without requiring excessive computational resources. The perturbation embedding system 100 can avoid the time and computing resources associated with excessive user interfaces and user interactions by utilizing unsupervised training methods and reducing the amount of training materials necessary to generate accurate predictions.

Further, the perturbation embedding system 100 can utilize the mixture of experts model to improve the accuracy of embeddings of atypical cell types, such as neuronal cells, compared to conventional systems. For example, the perturbation embedding system 100 can use a first embedding model, such as a masked auto-encoder model, to generate a first phenomic embedding, and a second embedding model, such as a balanced supervised contrastive learning model (a balanced supervised contrastive learning model, sometimes hereinafter referred to as a BSCL model) to generate a second phenomic embedding. The perturbation embedding system 100 can combine the first phenomic embedding and the second phenomic embedding according to mixture of experts combination weights to generate a mixture of experts phenomic embedding that accurately represents aspects of perturbed atypical cell types, such as perturbed neuronal cells.

Further, because the above-mentioned improvements are directed towards the technical field of utilizing machine learning models to generate embeddings, the above-mentioned improvements are necessarily directed towards improving the functionality of computing systems. For example, by utilizing the mixture of experts model the perturbation embedding system 100 provides improvements to computing systems by extracting biological features of a cell from a perturbed phenomic image and transforming them into a new feature space (e.g., a mixture of experts phenomap) that improves existing computing processes by providing new, accurate technical information.

In addition to providing improvements in the field of computing technology, through the mixture of experts model, the perturbation embedding system 100 additionally provides improvements in the technical field of drug discovery by reducing the resources required to develop new pharmaceutical compounds. Indeed, the perturbation embedding system 100 increases the efficiency of drug discovery processes by generating a feature space containing information relating to biological processes (e.g., the perturbations applied to cells to generate perturbed phenomic images), which can enable downstream targeted testing of compounds based on biological relationships the perturbation embedding system 100 learns and represents within the mixture of experts phenomap (e.g., the new feature space).

In addition, the perturbation embedding system 100 can provide a variety of improvements relative to conventional systems through an adapter model. For example, the perturbation embedding system 100 can improve accuracy relative to conventional systems. For example, the perturbation embedding system 100 can improve accuracy of implementing computing devices including generation of perturbation embeddings for downstream models or tasks. As mentioned above, conventional systems suffer from accurately modeling perturbation effects on cells, especially neuronal cells, due to various factors such as complex and highly varied neuronal cell physiology and morphology, as well as varied gene expression natural to the population and batch-specific effects on the cells caused by pluripotent stem-cell differentiation. In contrast, the perturbation embedding system 100 can account for these noise inducing factors by differentiating perturbation vectors relative to batch vectors and background vectors. The perturbation embedding system 100 improves the accuracy of implementing computing devices, especially with regard to difficult and complex cell types, by accounting for and mitigating these noise creating factors.

Moreover, through the adapter model, the perturbation embedding system 100 can improve operational flexibility relative to conventional systems. Indeed, the perturbation embedding system 100 can utilize an adapter architecture that flexibly learns to differentiate between perturbation impacts in machine learning representations relative to other confounding features. Moreover, in contrast to the rigidity and limited application of conventional systems relative to particular cell types, the perturbation embedding system 100 can operate across a variety of different cell types, including neuronal cells or other atypical cell types.

As suggested by the foregoing, this application utilizes a variety of terms to describe improvements and functions of the perturbation embedding system 100. For example, as used herein, the term "mixture of experts model" can refer to a computer-implemented algorithm that combines phenomic embeddings from different embedding models. For example, the perturbation embedding system 100 can use the mixture of experts model to combine phenomic embeddings according to mixture of experts combination weights to generate a mixture of experts phenomic embedding.

Moreover, as used herein, the term "perturbation" (e.g., cell perturbation") refers to an alteration or disruption to a cell (e.g., a biological cell) or the cell's environment (to elicit potential phenotypic changes to the cell). In particular, the term perturbation can include a gene perturbation (e.g., a gene-knockout-perturbation) or a compound perturbation (e.g., a molecule perturbation or a soluble factor perturbation). These perturbations are accomplished by performing a perturbation experiment. A perturbation experiment also includes a process for developing/growing the perturbed cell into a resulting phenotype.

Further, as used herein, a "perturbation similarity measure" (or a similarity measure) can refer to a measure of similarity between two or more perturbations. A perturbation similarity measure can include a comparison of embeddings (e.g., that indicate a measure of similar effects caused by two or more perturbations). Specifically, the perturbation similarity measure can be a comparison of quantifications of effects caused by perturbations. For example, the perturbation embedding system 100 can determine a perturbation similarity measure by comparing perturbation embeddings from embedding models (e.g., such as a first embedding model and a second embedding model) of a mixture of experts model. Additionally or alternatively, the perturbation embedding system 100 can determine the perturbation similarity measure by comparing a mixture of experts phenomic embedding with one or more additional mixture of experts phenomic embeddings. For example, the perturbation embedding system 100 can determine the perturbation similarity measure by determining a cosine similarity measure, a Euclidean distance (e.g., L2 norm), a Manhattan Distance (e.g., an L1 norm), a dot product similarity measure, a Jaccard similarity measure, a Mahalonobis measure, a Pearson correlation measure, or a Wasserstein distance measure, among others between two or more embeddings (e.g., phenomic embeddings from embedding models, mixture of experts phenomic embeddings from the mixture of experts model 108, or a combination of phenomic embeddings and mixture of experts phenomic embeddings).

Figure 2:
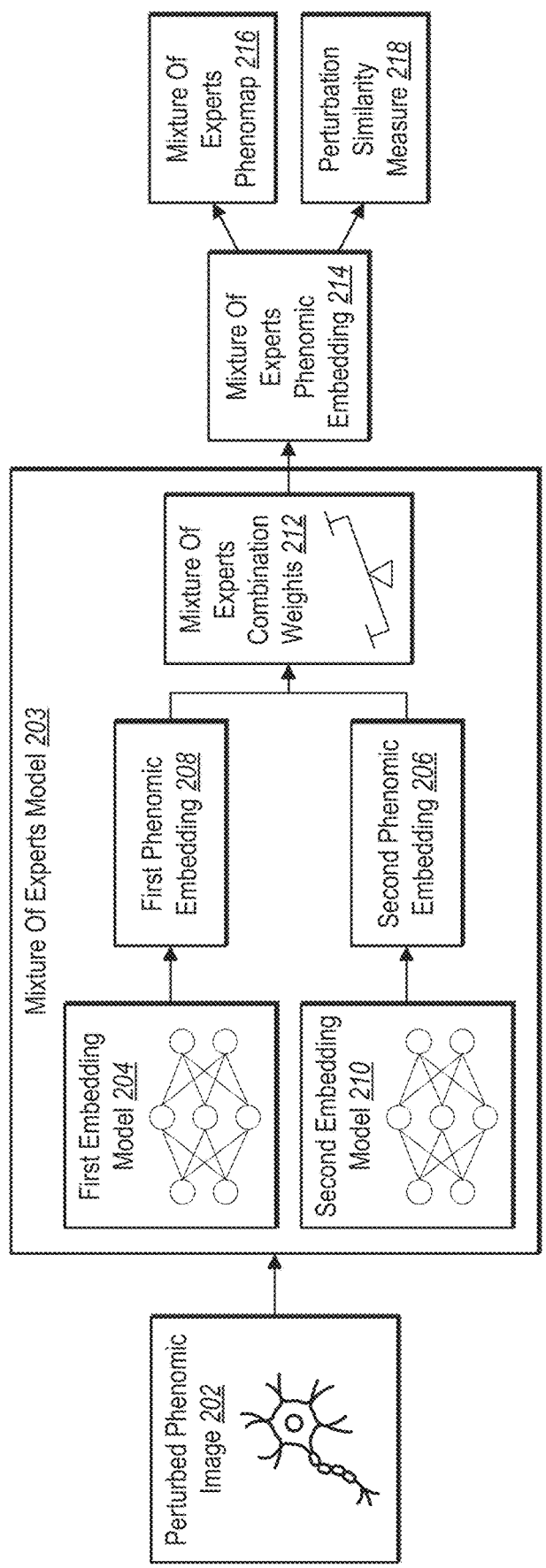
FIG. 2 illustrates a perturbation embedding system utilizing a first embedding model and a second embedding model to generate a mixture of experts phenomic embedding in accordance with one or more embodiments.

As mentioned above, the perturbation embedding system 100 can utilize a mixture of experts approach to combine perturbation embeddings from multiple perturbation embedding models. For example, FIG. 2 shows the perturbation embedding system 100 utilizing a mixture of experts model comprising multiple embedding models to generate a mixture of experts phenomic embedding 214 in accordance with one or more embodiments. As used herein, the term "mixture of experts phenomic embedding" can refer to an embedding generated utilizing a mixture of experts model. For example, a mixture of experts phenomic embedding includes a weighted combination of phenomic embeddings (e.g., a first phenomic embedding and a second phenomic embedding). For example, the mixture of experts phenomic embedding can be a vectorized combination of the first phenomic embedding and the second phenomic embedding. Indeed, the mixture of experts phenomic embedding can be an embedding in a feature space that represents different aspects of a perturbation on a cell, such as a perturbation classification or a bioactivity relationship among others.

As shown in FIG. 2, the perturbation embedding system 100 provides a perturbed phenomic image 202 to a mixture of experts model 203. The mixture of experts model 203 can include a first embedding model 204 and a second embedding model 210. As used herein, the term "embedding model" (e.g., a first embedding model and/or a second embedding model) can refer to a machine learning model that the perturbation embedding system 100 uses to generate embeddings (e.g., vector representations) of images or other indicators of a cellular response to a perturbation. For example, an embedding model can be a masked autoencoder model that generates digital images from masked images, and that the perturbation embedding system 100 further uses to generate embeddings from the digital images. Additionally or alternatively, an embedding model can be a balanced supervised contrastive learning model (BSCL model) that the perturbation embedding system 100 uses to create an embedding (e.g., a phenomic embedding) from a digital image (e.g., a perturbed phenomic image). In some embodiments, the perturbation embedding system 100 uses the BSCL to generate a phenomic embedding where similar perturbations are represented relatively close to each other compared to dissimilar embeddings. Further, the perturbation embedding system 100 can use the BSCL to balance different contributions (e.g., perturbations) such that the perturbation embedding system 100 accurately represents minority perturbations in the phenomic embedding. In some embodiments, an embedding model can be a bidirectional encoder model (e.g., a BERT model), a simple masked image model (e.g., a SimMIM model), a masked generative image transformer model (e.g., a MaskGIT model), a convolutional neural network, a vector quantized variational auto-encoder model (e.g., a VQ-VAE model), a diffusion model, a generative adversarial network model (e.g., a GAN), among others.

For example, the first embedding model 204 can be a masked-auto-encoder model trained to generate digital images from masked phenomic images. Additionally, the second embedding model 210 can be a balanced supervised contrastive learning model trained based on perturbation classification tasks. The perturbed phenomic image 202 can be a phenomic image 900 of FIG. 9A (discussed below), a background phenomic image 1002 or perturbed phenomic image 1004 of FIG. 10 (discussed below) or another phenomic image.

The perturbation embedding system 100 can select the first embedding model 204 and the second embedding model 210 from a variety of different embedding models, including a masked auto-encoder, a classification model (e.g., classification neural network trained to predict perturbation classifications), or a contrastive model, among others. The first embedding model 204 and the second embedding model 210 can have different architectures. The first embedding model 204 and the second embedding model 210 can be trained using different sets of training data. The perturbation embedding system 100 can select the first embedding model 204 and the second embedding model 210 according to any number of criteria, such as, training data (e.g., training that corresponds to a particular combination of perturbations) or performance (e.g., models perform above a threshold for a particular feature of the perturbed phenomic image 202).

The perturbation embedding system 100 utilizes the first embedding model 204 to create a first phenomic embedding 208 of the perturbed phenomic image 202. The perturbation embedding system 100 utilizes the second embedding model 210 to create a second phenomic embedding 206 of the perturbed phenomic image 202.

The perturbation embedding system 100 combines the first phenomic embedding 208 and the second phenomic embedding 206 using combination weights 212. The perturbation embedding system 100 can utilize a variety of approaches to determine the combination weights 212. In some implementations, the perturbation embedding system 100 selects the combination weights 212 based on features of the trained embedding models. For example, the perturbation embedding system 100 can select the combination weights 212 based on the number, quality, or amount of inputs (e.g., at training or inference) that the model receives. To illustrate, in some implementations, different phenomic embedding models analyze different image crops from a well (e.g., 64 image crops or 16 image crops). The perturbation embedding system 100 can determine combination weights based on the number of image crops and/or the number of wells (e.g., inverse to the number of wells). The perturbation embedding system 100 can also determine combination weights based on other factors, including the number of parameters in each trained model, the amount of training data, or the performance (e.g., recall and/or precision).

The perturbation embedding system 100 can utilize a variety of approaches to combine perturbation embeddings using combination weights. For example, in some implementations, the perturbation embedding system 100 utilizes a weight average. To illustrate, the perturbation embedding system 100 determines a first combination weight for the first embedding model 204 and applies the first combination weight to the first phenomic embedding 208 (e.g., by multiplying, dividing, or some other operation). The perturbation embedding system 100 determines a second combination weight for the second embedding model 210 and applies the second combination weight to the second phenomic embedding 206. The perturbation embedding system 100 then generates the mixture of experts phenomic embedding 214 by combining the modified embeddings (e.g., by adding, concatenating, averaging). In this manner, the perturbation embedding system 100 generates a mixture of experts phenomic embedding 214 that captures the effect of the perturbation on the cell utilizing both the first embedding model 204 and the second embedding model 210.

For example, in one or more embodiments, the perturbation embedding system 100 can determine to perform a gene-knockout sequence on a group of dorsal root ganglion cells. After performing the gene knockout sequence, the perturbation embedding system 100 can determine to take microscopic images of the results and use one of the microscopic images as the perturbed phenomic image 202. The perturbation embedding system 100 can select a masked auto-encoder for the first embedding model 204 and a contrastive model for the second embedding model 210. The perturbation embedding system 100 utilizes the first embedding model 204 (e.g., the masked auto-encoder model) to generate the first phenomic embedding 208. The perturbation embedding system 100 utilizes the second phenomic embedding 206 (e.g., the balanced supervised contrastive learning model) to generate the second phenomic embedding 206. The phenomic embedding system selects combination weights of 70% for the first phenomic embedding 208 and 30% of the second phenomic embedding 206. The perturbation embedding system 100 generates the mixture of experts phenomic embedding 214 according to the selected combination weights.

Additionally, the perturbation embedding system 100 can generate an additional mixture of experts phenomic embedding for at least one additional perturbation. For example, the perturbation embedding system 100 can generate the at least one additional mixture of experts phenomic embedding of a same type of perturbation applied to a same cell type (e.g., a same type of perturbation, such as a gene knockout, applied to a same type of cell depicted in a perturbed phenomic image). In some embodiments, the perturbation embedding system 100 can generate the at least one additional mixture of experts phenomic embedding of a same type of perturbation applied to a different cell type. Further, in some embodiments, the perturbation embedding system 100 can generate the at least one additional mixture of experts phenomic embedding of a different type of perturbation applied to a same cell type. Additionally, in some embodiments, the perturbation embedding system 100 can generate the ate least one additional mixture of experts phenomic embedding of a different type of perturbation applied to a different cell type.

Based on generating the additional mixture of experts phenomic embedding, the perturbation embedding system 100 can combine the additional mixture of experts phenomic embedding with the mixture of experts phenomic embedding 214 to generate a mixture of experts phenomap 216. As used herein, the term "mixture of experts perturbation phenomap" refers to a combination of mixture of experts phenomic embeddings. For example, the mixture of experts phenomap can include a mixture of experts phenomic embedding for a perturbation, and an additional mixture of experts phenomic embedding for an additional perturbation. Indeed, the perturbation embedding system 100 can use the mixture of experts phenomap to compare and contrast effects of perturbations on cells (e.g., where similar effects on cells are relatively close together in the mixture of experts phenomap compared to dissimilar effects on cells that are relatively distant from each other).

Indeed, the perturbation embedding system 100 can use the mixture of experts phenomap 216 as a feature space that represents different effects of perturbations on cells. Where the mixture of experts phenomic embedding 214 and the additional mixture of experts phenomic embedding represent perturbations of a same type performed on cells of different types, the perturbation embedding system 100 can use the mixture of experts phenomap 216 to represent how different cell types react to a similar type of perturbation. Further, where the mixture of experts phenomic embedding 214 and the additional mixture of experts phenomic embedding represent perturbations of a different type performed on cells of a same type, the perturbation embedding system 100 can use the mixture of experts phenomap 216 to represent how different perturbations impact cells of the same type.

Additionally, the perturbation embedding system 100 can compare the mixture of experts phenomic embedding 214 with at least one additional mixture of experts phenomic embedding to generate a perturbation similarity measure 218. For example, the perturbation embedding system 100 can determine the perturbation similarity measure (or some similar type of measure as mentioned above) by determining a cosine similarity measure between the mixture of experts phenomic embedding 214 and the at least one additional mixture of experts phenomic embedding. In some embodiments, the perturbation embedding system 100 can utilize the embeddings from the mixture of experts phenomap 216 (e.g., the mixture of experts phenomic embedding 214 and the at least one additional mixture of experts phenomic embedding). In some embodiments, the perturbation embedding system 100 can use an additional mixture of experts phenomic embedding that is different from the at least one additional mixture of experts phenomic embedding from the mixture of experts phenomap 216 to generate the perturbation similarity measure 218. Indeed, in some embodiments, the perturbation embedding system 100 can select the at least one additional mixture of experts phenomic embedding based on generating the mixture of experts phenomap 216 (e.g., the perturbation embedding system 100 can iteratively combine and/or compare mixture of experts phenomic embeddings).

Figure 3:
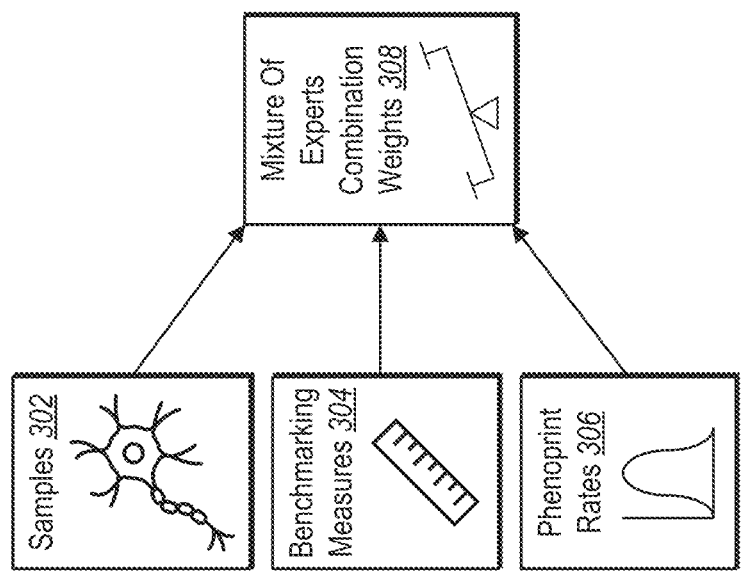
FIG. 3 illustrates a perturbation embedding system determining mixture of experts combination weights in accordance with one or more embodiments.

As previously mentioned, in some embodiments, the perturbation embedding system 100 can combine a first phenomic embedding and a second phenomic embedding according to mixture of experts combination weights. Indeed, the perturbation embedding system 100 can determine the mixture of experts combination weights according to a variety of factors. FIG. 3 illustrates the perturbation embedding system 100 determining mixture of experts combination weights according to factors including benchmarking measures, samples used to train embedding models, and/or phenoprint rates of embedding models.

As used herein, the term "benchmarking measure" can refer to a level of accuracy of a predicted bioactivity relationship relative to a benchmark. For example, a benchmarking measure can include a level of accuracy of a predicted bioactivity relationship for a perturbation pair (e.g., as depicted in a pair of phenomic embeddings). For example, the perturbation embedding system 100 can utilize a model (e.g., a first embedding model, a second embedding model, and/or a mixture of experts model) to generate a pair of phenomic embeddings (and/or a pair of mixture of experts phenomic embeddings). The perturbation embedding system 100 can generate a perturbation similarity measure (indicating a predicted bioactivity relationship) and compare the perturbation similarity measure with a benchmark bioactivity database to determine a benchmarking measure. For example, a benchmarking measure can be a prediction accuracy measure (e.g., a classification accuracy measure) such as an F1 score, a ranking measure such as a Spearman's correlation, a regression measure such as a mean squared error metric, or a calibration measure such as a Brier score, among others. Additionally, in some embodiments, the benchmarking measure can indicate a relationship between a perturbation pair (e.g., such as that both perturbations of the perturbation pair target a same gene). Further, the benchmarking measure can include one or more recall metrics that reflect the accuracy of predicted relationships (e.g., predicted measures of bioactivity) relative to observed relationships (e.g., as identified in the benchmark bioactivity database).

In addition, as used herein, the term "phenoprint rate" can refer to a measure of statistical significance of a perturbation and/or a representation of a perturbation (e.g., such as a phenomic embedding). For example, the perturbation embedding system 100 can determine a phenoprint rate by determining a statistical significance of a plurality of phenomic embeddings for a perturbation generated by an embedding model. The perturbation embedding system 100 can process embeddings from different respective models to determine a phenoprint rate for the respective models. For example, the perturbation embedding system 100 can process a first plurality of embeddings from a first embedding model to determine a phenoprint rate for the first embedding model. Similarly, the perturbation embedding system 100 can process a second plurality of embeddings from a second embedding model to determine a phenoprint rate for the second embedding model. In addition, the perturbation embedding system 100 can process a plurality of mixture of experts phenomic embeddings from a mixture of experts model to determine a phenoprint rate for the mixture of experts model.

As illustrated in FIG. 3, the perturbation embedding system 100 can determine mixture of experts combination weights 308 (e.g., to use in generating a mixture of experts phenomic embedding from a first phenomic embedding and a second phenomic embedding) according to samples 302 (e.g., segments of phenomic images) the perturbation embedding system 100 used to train embedding models. As used herein, the term "mixture of experts combination weights" refers to a weighted ratio the perturbation embedding system 100 utilizes when combining different embeddings (e.g., a first phenomic embedding that the perturbation embedding system 100 generates using a first embedding model of the mixture of experts model and a second phenomic embedding that the perturbation embedding system 100 generates using a second embedding model of the mixture of experts model). For example, the perturbation embedding system 100 can apply the mixture of experts combination weights to emphasize the first phenomic embedding and/or the second phenomic embedding, respectively.

As shown in FIG. 3, the perturbation embedding system 100 can determine the mixture of experts combination weights 308 according to samples 302 used to train embedding models. For example, the perturbation embedding system 100 can train a first embedding model by generating a first number of samples (e.g., segments) from a perturbed phenomic image, generating a first set of embeddings for each of the first number of samples, and training the first phenomic embedding model utilizing the first set of embeddings. Additionally, the perturbation embedding system 100 can train a second embedding model by generating a second number of samples (e.g., segments) from the perturbed phenomic image, generating a second set of embeddings for each of the second number of samples, and training the second phenomic embedding model utilizing the second set of embeddings. The perturbation embedding system 100 can determine the samples 302 from the first set of segments and the second set of segments, and determine the mixture of experts combination weights 308 according to the samples 302. More information regarding the perturbation embedding system 100 determining the mixture of experts combination weights 308 according to the number of samples 302 can be found below with regard to FIG. 4.

Further, as shown in FIG. 3, the perturbation embedding system 100 can determine the mixture of combination weights 308 according to benchmarking measures 304 achieved by a first embedding model and/or a second embedding model (e.g., benchmarking measures from a benchmark bioactivity database). For example, the perturbation embedding system 100 can compare aspects of phenomic embeddings the perturbation embedding system 100 generates using an embedding model (e.g., a first embedding model and/or a second embedding model) to determine a predicted bioactivity relationship from perturbations. The perturbation embedding system 100 can compare the predicted bioactivity result with a known bioactivity result for the perturbation to generate the benchmarking measures 304 (e.g., to determine whether the perturbation embedding system 100 represents impacts of perturbations on cells at or above a threshold level of accuracy). The perturbation embedding system 100 can use the benchmarking measures 304 to determine the mixture of experts combination weights. More information regarding the perturbation embedding system 100 using benchmarking measures 304 to determine mixture of experts combination weights 308 can be found below with regard to the discussion of FIG. 5.

Additionally, as shown in FIG. 3, the perturbation embedding system 100 can determine the mixture of experts combination weights 308 according to phenoprint rates 306 of the first embedding model and the second embedding model. For example, the perturbation embedding system 100 can determine a rate of statistical significance of phenomic embeddings generated by the first embedding model and the second embedding model. Specifically, the perturbation embedding system 100 can determine a first fraction of statistically significant phenomic embeddings for perturbation classes that the perturbation embedding system 100 generates using the first embedding model and a second fraction of statistically significant phenomic embeddings for perturbation classes the perturbation embedding system 100 generates using the second embedding model. The perturbation embedding system 100 can use the first rate of statistical significance and the second rate of statistical significance to determine the phenoprint rates 306 (e.g., a first phenoprint rate for the first embedding model and a second phenoprint rate for the second embedding model). More information regarding the perturbation embedding system 100 determining phenoprint rates can be found below with regard to FIG. 6.

Indeed, as shown in FIG. 3, the perturbation embedding system 100 can determine the mixture of experts combination weights according to the samples 302, the benchmarking measures 304, and the phenoprint rates 306. For example, the perturbation embedding system 100 can determine that phenomic embeddings the perturbation embedding system 100 generates utilizing the first embedding model meet more benchmarking measures 304 compared to phenomic embeddings the perturbation embedding system 100 generates utilizing the second phenomic embedding model. Additionally, the perturbation embedding system 100 can determine that phenomic embeddings the perturbation embedding system 100 generates utilizing the second embedding model have higher phenoprint rates compared to phenomic embeddings the perturbation embedding system 100 generates utilizing the first embedding model. The perturbation embedding system 100 can determine the mixture of experts combination weights 308 such that when the perturbation embedding system 100 uses the mixture of experts combination weights 308 to generate a mixture of experts phenomic embedding from a first phenomic embedding from the first embedding model and a second phenomic embedding from the second embedding model such that the relative strengths of each embedding model (e.g., the benchmarking measures of the first phenomic embedding from the first embedding model and the phenoprint rates of the second phenomic embedding from the second embedding model) are represented in the mixture of experts phenomic embedding.

Figure 4:
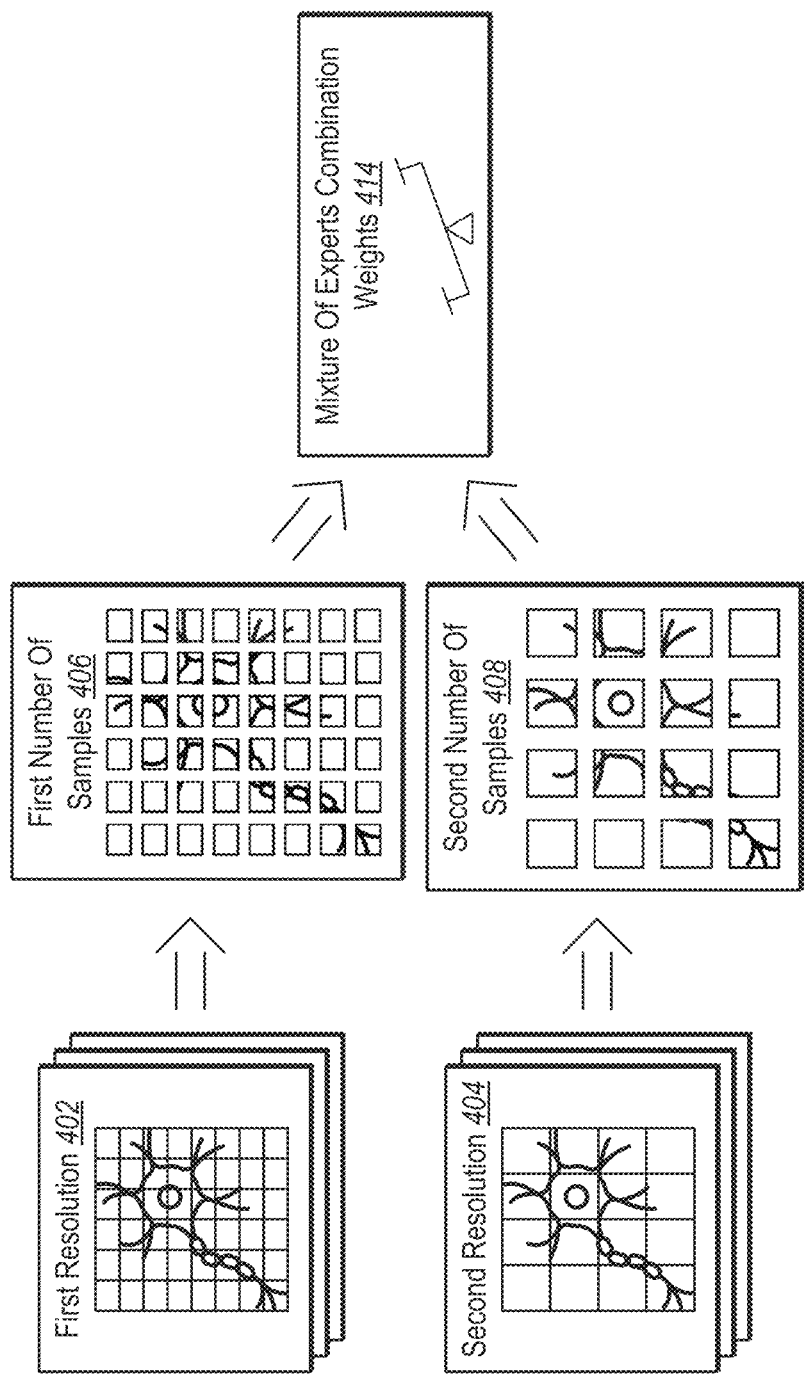
FIG. 4 illustrates a perturbation embedding system training a first phenomic embedding model and a second phenomic embedding model in accordance with one or more embodiments.

As previously mentioned, the perturbation embedding system 100 can determine mixture of experts combination weights (e.g., for a mixture of experts phenomic embedding) according to different numbers of samples for the first embedding model and the second embedding model. FIG. 4 illustrates the perturbation embedding system 100 training a first embedding model and a second embedding model using different numbers of samples from different resolutions of perturbed phenomic images, and using the different numbers of samples to determine mixture of experts combination weights.

As shown in FIG. 4, the perturbation embedding system 100 can generate crops of a perturbed phenomic image according to a first resolution 402. For example, the perturbation embedding system 100 can determine that the first resolution 402 is 256 pixels by 256 pixels (e.g., 256×256). Additionally, the perturbation embedding system 100 can generate crops of the perturbed phenomic image according to a second resolution 404. For example, the perturbation embedding system 100 can determine that the second resolution 404 is 512 pixels by 512 pixels (e.g., 512×512).

Further, the perturbation embedding system 100 can determine the first resolution 402 according to a first type of the first embedding model. To illustrate, the perturbation embedding system 100 can determine that the first embedding model is a masked auto-encoder model, and determine the first resolution 402 based on determining that the first embedding model is the masked auto-encoder model. Additionally, the perturbation embedding system 100 can determine the second resolution 404 according to a second type of the second embedding model. To elaborate, the perturbation embedding system 100 can determine that the second embedding model is a BSCL model, and determine the second resolution 404 based on determining that the second embedding model is the BSCL model.

As illustrated in FIG. 4, the perturbation embedding system 100 can segment the perturbed phenomic image to generate a first number of samples 406 according to the first resolution 402. To illustrate, the perturbation embedding system 100 can generate the first number of samples 406 by generating 64 crops from the perturbed phenomic image, wherein each of the first number of samples (e.g., each of the 64 crops) has dimensions according to the first resolution 402 (e.g., 256×256). Additionally, the perturbation embedding system 100 can segment the perturbed phenomic image to generate a second number of samples 408 according to the second resolution 404. To elaborate, the perturbation embedding system 100 can generate the second number of samples 408 by generating 16 crops from the perturbed phenomic image, wherein each of the second number of samples 408 (e.g., each of the 16 crops) has dimensions according to the second resolution 404 (e.g., 512×512).

Additionally, the perturbation embedding system 100 can use the first number of samples 406 to train a first phenomic embedding model. Specifically, the perturbation embedding system 100 can train the first phenomic embedding model by generating an embedding from each of the first number of samples 406 (e.g., 64 embeddings from 64 samples) and/or randomly selecting one or more samples of the first number of samples 406 and generating embeddings of the randomly selected one or more samples. Further, the perturbation embedding system 100 can aggregate the embeddings to generate a first embedding, comparing the first embedding to a first ground truth to determine a first measure of loss, and modifying parameters of the first embedding model according to the first measure of loss. Specifically, when determining the first measure of loss and modifying parameters of the first embedding model, the perturbation embedding system 100 can train the first embedding model to generate digital images from masked phenomic images.

Moreover, the perturbation embedding system 100 can use the second number of samples 408 to train a second phenomic embedding model. Indeed, the perturbation embedding system 100 can train the second phenomic embedding model by generating an embedding from each of the second number of samples 408 (e.g., 16 embeddings from 16 samples) and/or randomly selecting one or more samples from the second number of samples 408 and generating embeddings of the randomly selected one or more samples. Further, the perturbation embedding system 100 can aggregate the embeddings to generate a second embedding, comparing the second embedding to a second ground truth to determine a second measure of loss, and modifying parameters of the second embedding model according to the second measure of loss. Specifically, when determining the second measure of loss and modifying parameters of the second embedding model, the perturbation embedding system 100 can train the second embedding model in perturbation classification tasks (e.g., to determine types of perturbations applied to cells).

Further, as shown, the perturbation embedding system 100 can utilize the first number of samples 406 and the second number of samples 408 to determine mixture of experts combination weights 414 (e.g., to use to generate a mixture of experts phenomic embedding). Indeed, when the perturbation embedding system 100 can select the mixture of experts combination weights 414 to account for or accentuate a difference between the first number of samples 406 and the second number of samples 408. For example, in some embodiments, the perturbation embedding system 100 can select the mixture of experts combination weights 414 to be one to four of the first number of samples 406 to the second number of samples 408 (e.g., one to four in favor of the second number of samples used to train the second embedding model).

Further, in some embodiments, the perturbation embedding system 100 can determine the first number of samples 406 to be a number of samples from a first embedding model and the second number of samples 408 to be a number of samples from a second embedding model. The perturbation embedding system 100 can combine the first embedding and the second embedding to generate a mixture of experts phenomic embedding. To illustrate, in some embodiments the perturbation embedding system 100 can determine the mixture of experts combination weights 414 from respective numbers of samples from respective embedding models in a mixture of experts phenomic embedding. Accordingly, the perturbation embedding system 100 can utilize the mixture of experts combination weights 414 to account for different amounts of samples from different models both when training the respective models, and when using the respective models (e.g., at inference) to generate a mixture of experts phenomic embedding.

Figure 5:
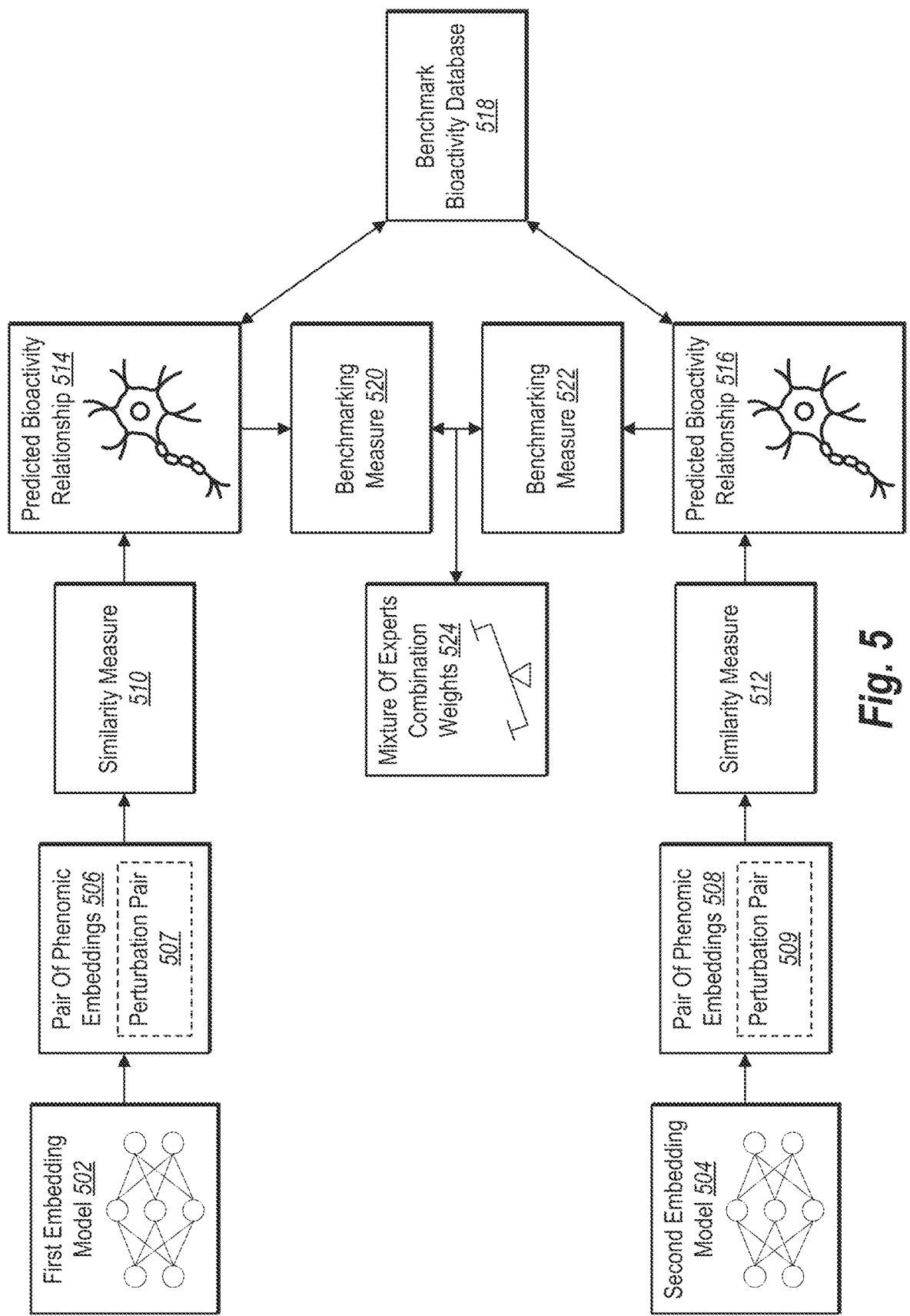
FIG. 5 illustrates a perturbation embedding system determining mixture of experts combination weights according to benchmarking measures from phenomic embeddings in accordance with one or more embodiments.

As previously mentioned, the perturbation embedding system 100 can determine benchmarking measures for phenomic embedding models and utilize the benchmarking measures to determine mixture of experts combination weights (e.g., to use to generate a mixture of experts phenomic embedding). FIG. 5 illustrates the perturbation embedding system 100 determining similarity measures for pairs of phenomic embeddings generated by embedding models (e.g., a first embedding model and a second embedding model), and utilizing the similarity measures to determine benchmarking measures.

As shown in FIG. 5, the perturbation embedding system 100 can utilize a first embedding model 502 to generate a pair of phenomic embeddings 506. Similarly, the perturbation embedding system 100 can utilize a second embedding model 504 to generate a pair of phenomic embeddings 508. Indeed, the pair of phenomic embeddings 506 can correspond to a perturbation pair 507, and the pair of phenomic embeddings 508 can correspond to a perturbation pair 509. In some embodiments, the perturbation pair 507 corresponding to the pair of phenomic embeddings 506 can be a same perturbation pair as the perturbation pair 509 corresponding to the pair of phenomic embeddings 508. In some embodiments, the perturbation pair 507 corresponding to the pair of phenomic embeddings 506 can be a different perturbation pair from the perturbation pair 509 corresponding to the pair of phenomic embeddings 508.

As used herein, the term "perturbation pair" refers to a pair of perturbations (e.g., gene knockouts, compounds, or a gene knockout-compound pair) performed on cells For example, the pair of perturbations can be a first perturbation performed on a first cell and a second perturbation performed on a second cell. The first perturbation and the second perturbation can be a same type of perturbation or a different perturbation.

As shown in FIG. 5, the perturbation embedding system 100 can compare the pair of phenomic embeddings 506 to determine a similarity measure 510. Similarly, the perturbation embedding system 100 can compare the pair of phenomic embeddings 508 to determine a similarity measure 512 (e.g., a perturbation similarity measure) that indicates a measure of similarity between the pair of phenomic embeddings. For example, the perturbation embedding system 100 can use the similarity measure 512 to indicate similarities such as functional response similarities in cells (e.g., cells that the perturbation embedding system 100 applies a perturbation to).

As illustrated, the perturbation embedding system 100 can utilize the similarity measure 510 to generate or otherwise determine a predicted bioactivity relationship 514 for the perturbation pair 507. Similarly, the perturbation embedding system 100 can utilize the similarity measure 512 to generate or otherwise determine a predicted bioactivity relationship 516 for the perturbation pair 509. As used herein, the term "predicted bioactivity relationship" can refer to a predicted relationship between a perturbation pair. For example, a predicted bioactivity relationship can be an indication of a biological relationship, expression (e.g., gene expression) or activity. For example, a predicted bioactivity relationship can be that both perturbations of a perturbation pair will induce cancer in a cell, or that both perturbations of a perturbation pair will induce suppression of a gene.

As shown in FIG. 5, the perturbation embedding system 100 can compare the predicted bioactivity relationship 514 with a benchmark bioactivity database 518 to determine a benchmarking measure 520 for the first embedding model 502. Similarly, the perturbation embedding system 100 can compare the predicted bioactivity relationship 516 with the benchmark bioactivity database 518 to determine a benchmarking measure 522 for the second embedding model 504. As used herein, the term "benchmark bioactivity database" can refer to a database of known information regarding a perturbation (e.g., regarding a gene and/or pharmaceutical compound). For example, the database can include datasets regarding known drug-target interactions, perturbation effects, or measured bioactivity results, among others. For example, a benchmark bioactivity database can be a protein-protein interaction database (e.g., Reactome), a pathway interaction database (e.g., Signaling Network Open Resource, also referred to herein as SIGNOR), a protein complex database (e.g., Comprehensive ResoUrce of Mammalian protein complexes, also referred to herein as CORUM). Additional activities of benchmark bioactivity databases can include ChEMBL, PubChem BioAssay, BindingDB, DrugBank, ZINC, LINCS L1100, DepMap, Cell Painting, GDSC, PRISM Repurposing, PDBind, TCMSP, STITCH, TOXCAST, FAERS, eTOX, DUD-E, Tox21, KEGG Drug Database, among others.

Indeed, the perturbation embedding system 100 can use the benchmarking measure 520 to determine a first level of accuracy of phenomic embeddings the perturbation embedding system 100 uses the first embedding model 502 to generate. Similarly, the perturbation embedding system 100 can use the benchmarking measure 522 to determine a second level of accuracy of phenomic embeddings the perturbation embedding system 100 uses the second embedding model 504 to generate. Further, the perturbation embedding system 100 can utilize the benchmarking measure 520 and the benchmarking measure 522 to determine an aspect of mixture of experts combination weights 524 (e.g., that the perturbation embedding system 100 utilizes to generate mixture of experts phenomic embeddings).

For example, the perturbation embedding system 100 can compare the benchmarking measure 520 with the benchmarking measure 522 to determine that determine that, for a given perturbation pair (e.g., the perturbation pair 507 and the perturbation pair 509 are the same perturbations) the benchmarking measure 520 for the pair of phenomic embeddings 506 from the first embedding model 502 is higher than the benchmarking measure 520 for the pair of phenomic embeddings 508 from the second embedding model 504. Accordingly, the perturbation embedding system 100 can generate the mixture of experts combination weights 524 such that the relatively higher level of accuracy of the benchmarking measure 520 of the first embedding model 502 is reflected in the mixture of experts phenomic embedding.

Figure 6:
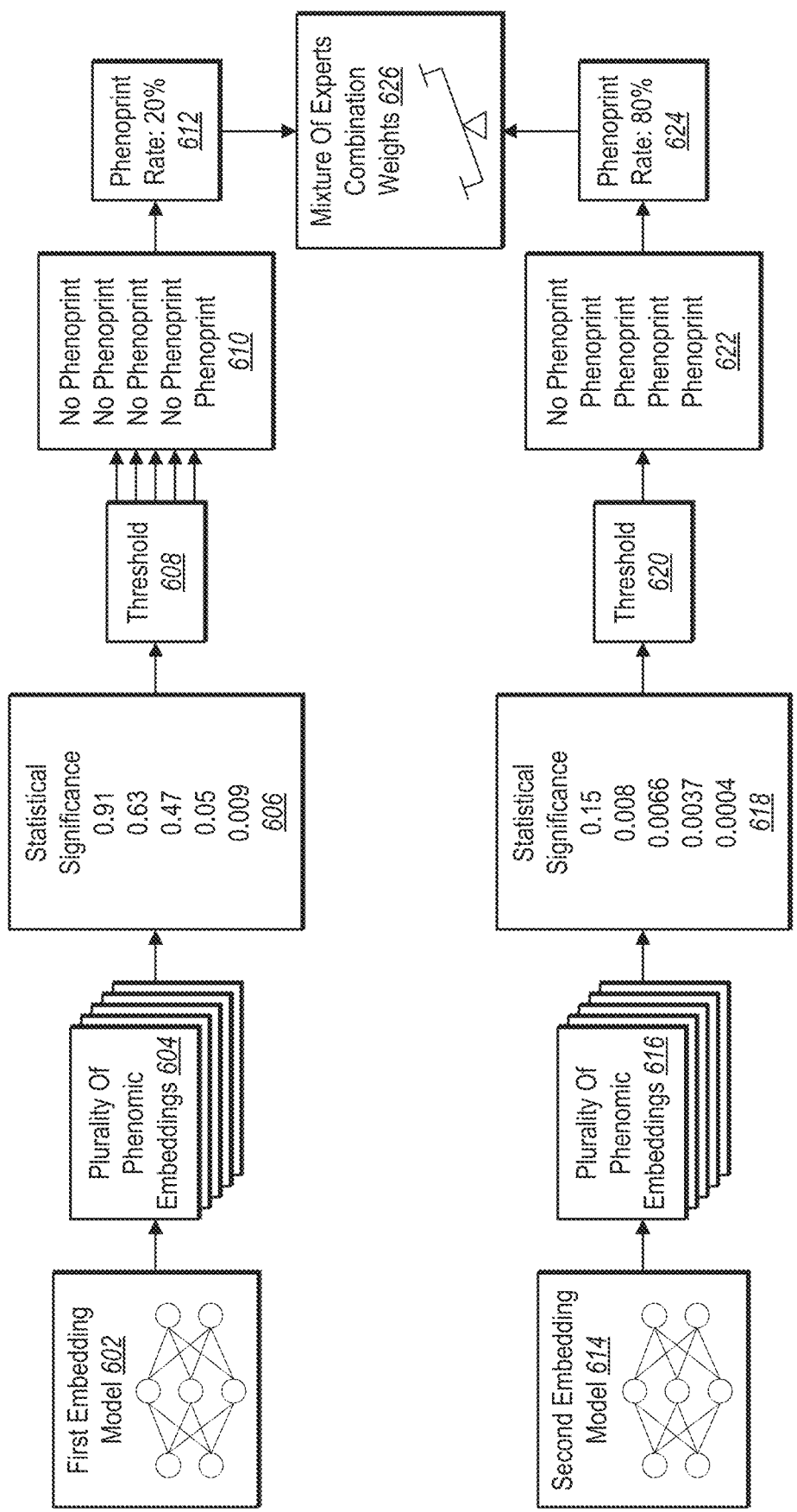
FIG. 6 illustrates a perturbation embedding system determining mixture of experts combination weights according to phenoprint rates from phenomic embeddings in accordance with one or more embodiments.

As previously mentioned, the perturbation embedding system 100 can determine the mixture of experts combination weights according to phenoprint rates for the first embedding model and the second embedding model. FIG. 6 illustrates the perturbation embedding system 100 determining a phenoprint rate for a plurality of phenomic embeddings from a first embedding model and a second embedding model.

As shown in FIG. 6, the perturbation embedding system 100 can use a first embedding model 602 to generate a plurality of phenomic embeddings 604. Additionally, the perturbation embedding system 100 can use a second embedding model 614 to generate a plurality of phenomic embeddings 616. The plurality of phenomic embeddings 604 and 616 can include a first plurality of phenomic embeddings that correspond to a first perturbation, a second plurality of phenomic embeddings that correspond to a second perturbation, a third plurality of phenomic embeddings that correspond to a third perturbation, etc. For each collection of embeddings corresponding to each perturbation, the perturbation embedding system 100 can determine a measure of statistical significance (e.g., the plurality of measures of statistical significance 606 for the plurality of phenomic embeddings 604 and the plurality of measures of statistical significance 618 for each of the plurality of phenomic embeddings 616).

The perturbation embedding system 100 can determine a comparison value for each phenomic embedding (e.g., relative to other embeddings corresponding to the same perturbation). The perturbation embedding system 100 can then combine these comparison values for embeddings of a particular perturbation. The perturbation embedding system 100 can then utilize these combined comparison values to determine a measure of statistical significance relative to a null distribution (e.g., relative to distribution of random perturbation embeddings). In this manner, the perturbation embedding system 100 can determine measures of statistical significance for embeddings resulting from each perturbation analyzed by different embedding models. Moreover, based on comparing these measures of statistical significance to a threshold, the perturbation embedding system 100 can determine a phenoprint rate 612 (e.g., a rate of statistical significance).

For example, for each replicate of a given perturbation within one experiment (e.g. CRISPR knockout guide or compound addition at one concentration), the perturbation embedding system 100 can calculate a cross-validated angle (CV-angle, e.g., a comparison value) with respect to the other replicates of that same perturbation. Specifically, this can be an angle between a vector representation of a replicate well (e.g., a phenomic embedding of a first plurality of phenomic embeddings of the plurality of phenomic embeddings 616) and an average vector representation for the other replicate wells (e.g., other phenomic embeddings of the first plurality of phenomic embeddings). The perturbation embedding system 100 can then average the CV-angles for all replicates (e.g., each phenomic embedding of the first plurality of phenomic embeddings) to determine a mean-CV-angle (e.g., an average comparison value). Further, the perturbation embedding system 100 can use the mean-CV-angle as a test statistic for that perturbation. In order to generate empirical p-values (e.g., to generate each measure of the plurality of measures of statistical significance 618), the perturbation embedding system 100 can compare these statistics to a null distribution where instead of calculating the mean-CV-angle from wells with the same perturbation, the perturbation embedding system 100 can calculate it from wells treated with different perturbations, controlling for perturbation type as well as plate distribution (i.e. so that the perturbation embedding system 100 can compare a test statistic for a given perturbation to a null distribution that includes values for replicates distributed in the same manner across the same experimental plates). Specifically, the perturbation embedding system 100 can use the empirical mean-CV-angle p-value as a proportion of mean-CV-angles in the null distribution that are smaller than the mean-CV-angle for the perturbation. In some embodiments, the perturbation embedding system 100 can generate the null distribution to contains 10,000 random samples, so the smallest p-value (e.g., measure of statistical significance) the perturbation embedding system 100 can reliably assess is 0.0001. Additionally, the perturbation embedding system 100 can convert the mean-CV-angle statistics to Z-scores by calculating the mean and standard deviation of the null and standardizing to those values. The perturbation embedding system 100 can determine that a perturbation has a "phenoprint" in an experiment if it has a mean-CV-angle p-value of less than 0.01 (e.g., is below the threshold 620). Further, when the perturbation embedding system 100 has or performs replicate experiments, the perturbation embedding system 100 can use the median of the p-values across experiment (biological) replicates as a first-pass assessment.

The perturbation embedding system 100 can determine the phenoprint rate 612 and the phenoprint rate 624 utilizing this approach. For example, the perturbation embedding system 100 can determine an average comparison value for a first plurality of phenomic embeddings, a second plurality of phenomic embeddings, a third plurality of phenomic embeddings, etc., of the plurality of phenomic embeddings. The perturbation embedding system 100 can determine a statistical significance for each plurality of phenomic embeddings of the plurality of phenomic embeddings 604 by comparing the average comparison value with a null distribution to determine whether the average comparison value is below a threshold.

As illustrated, the perturbation embedding system 100 can determine the phenoprint classifications 610 by determining whether each measure of statistical significance of the plurality of measures of statistical significance 606 is below the threshold 608. For example, the perturbation embedding system 100 can determine a first measure of statistical significance of the plurality of measures of statistical significance 606 for a first plurality of phenomic embeddings of the plurality of phenomic embeddings 604 of 0.91, a second measure of statistical significance of 0.63, a third measure of statistical significance 0.47, a fourth measure of statistical significance of 0.05, and a fifth measure of statistical significance of 0.009. The perturbation embedding system 100 can compare each measure of statistical significance of the plurality of measures of statistical significance 606 to the threshold 608 to determine whether each measure of statistical significance is below the threshold 608 (e.g., 0.01). The perturbation embedding system 100 can determine the phenoprint classifications 610 to indicate which measures of statistical significance are below the threshold 608. For example, the perturbation embedding system 100 can determine "No Phenoprint" for the first measure of statistical significance, the second measure of statistical significance, the third measure of statistical significance, and the fourth measure of statistical significance because each of the first, second, third, and fourth measure of statistical significance are above the threshold 608. Additionally, the perturbation embedding system 100 can determine "Phenoprint" for the fifth measure of statistical significance responsive to determining the fifth measure of statistical significance is above the threshold 608.

As illustrated, the perturbation embedding system 100 can utilize the phenoprint classifications 610 to determine a phenoprint rate 612. For example, based on determining "Phenoprint" for one out of five measures of statistical significance of the plurality of measures of statistical significance 606, the perturbation embedding system 100 can determine the phenoprint rate 612 is 20%.

Additionally, as illustrated, the perturbation embedding system 100 can determine phenoprint classifications 622 by determining whether each measure of the plurality of measures of statistical significance 618 is below the threshold 620. For example, the perturbation embedding system 100 can determine a first measure of statistical significance for a first plurality of phenomic embeddings of the plurality of phenomic embeddings 616 of 0.15, a second measure of statistical significance of 0.008, a third measure of statistical significance 0.0066, a fourth measure of statistical significance of 0.0037, and a fifth measure of statistical significance of 0.0004. The perturbation embedding system 100 can compare each measure of statistical significance to the threshold 620 to determine whether each measure of statistical significance is below the threshold 620 (e.g., 0.01). The perturbation embedding system 100 can determine the phenoprint classifications 622 to indicate which measures of statistical significance are below the threshold 620. For example, the perturbation embedding system 100 can determine "No Phenoprint" for the first measure of statistical significance of the plurality of measures of statistical significance 618, because the first measure of statistical significance of the plurality of measures of statistical significance 618 is above the threshold 620. Moreover, the perturbation embedding system 100 can determine "Phenoprint" for the second, third, fourth, and fifth measures of statistical significance of the plurality of measure of statistical significance 618 because the second, third, fourth, and fifth measures of the plurality of measures of statistical significance 618 are below the threshold 620.

As illustrated, the perturbation embedding system 100 can utilize the phenoprint classifications 622 to determine a phenoprint rate 624. For example, based on determining "Phenoprint" for four out of five of the plurality of measures of statistical significance 618, the perturbation embedding system 100 can determine the phenoprint rate 624 is 80%.

As illustrated, the perturbation embedding system 100 can determine mixture of experts combination weights 626 (e.g., to use to generate a mixture of experts phenomic embedding) based on the phenoprint rate 612 for the plurality of phenomic embeddings 604 from the first embedding model 602 and based on the phenoprint rate 624 for the plurality of phenomic embeddings 616 from second embedding model 614. Accordingly, the perturbation embedding system 100 can compare the phenoprint rate 612 and the phenoprint rate 624 to compare relative significance/consistency/accuracy of embeddings resulting from the first embedding model 602 and the second embedding model 614. Accordingly, in some embodiments the perturbation embedding system 100 can determine the mixture of experts combination weights 626 to generate a mixture of experts phenomic embedding with a relatively high phenoprint rate (e.g., by selecting the mixture of experts combination weights 626 such that the perturbation embedding system 100 emphasizes the phenoprint rate 624 of the second embedding model 614, such as a BSCL model, compared to the first embedding model 602, such as a masked auto-encoder model).

Indeed, as discussed above with regards to FIGS. 5-6, the perturbation embedding system 100 can select mixture of experts combination weights to enable the perturbation embedding system 100 to generate a mixture of experts phenomic embedding that reflects the benefits of multiple models. In other words, the perturbation embedding system 100 can determine mixture of experts combination weights such that when the perturbation embedding system 100 generates a mixture of experts phenomic embedding, the relative strengths of the first embedding model and the second embedding model are present in the mixture of experts phenomic embedding. To illustrate, the perturbation embedding system 100 can select the mixture of experts combination weights such that the perturbation embedding system 100 can generate a mixture of experts phenomic embedding to yield relatively high benchmarking measures due to contributions from the first embedding model and relatively high phenoprint rates due to contributions from the second embedding model. Further, in some embodiments, the perturbation embedding system 100 can determine that varying the mixture of experts combination weights has disparate results on the mixture of experts phenomic embedding. For example, as previously discussed with regard to FIG. 4, in some embodiments, the perturbation embedding system 100 can determine the mixture of experts combination weights to be a ratio of one to four of the first embedding model to the second embedding model. In some embodiments, the perturbation embedding system 100 can determine that by changing the mixture of experts combination weights to be a ratio of sixty-four to one of the first embedding model to the second embedding model, the perturbation embedding system 100 can generate a mixture of experts phenomic embedding that does not achieve as high of phenoprint rates compared to the one to four ratio, but that achieves significantly better benchmarking measures compared to the one to four ratio. Accordingly, the perturbation embedding system 100 can modify the mixture of experts combination weights to optimize relative accuracies of benchmarking measures and phenoprint rates in the mixture of experts phenomic embedding.

Figure 7:
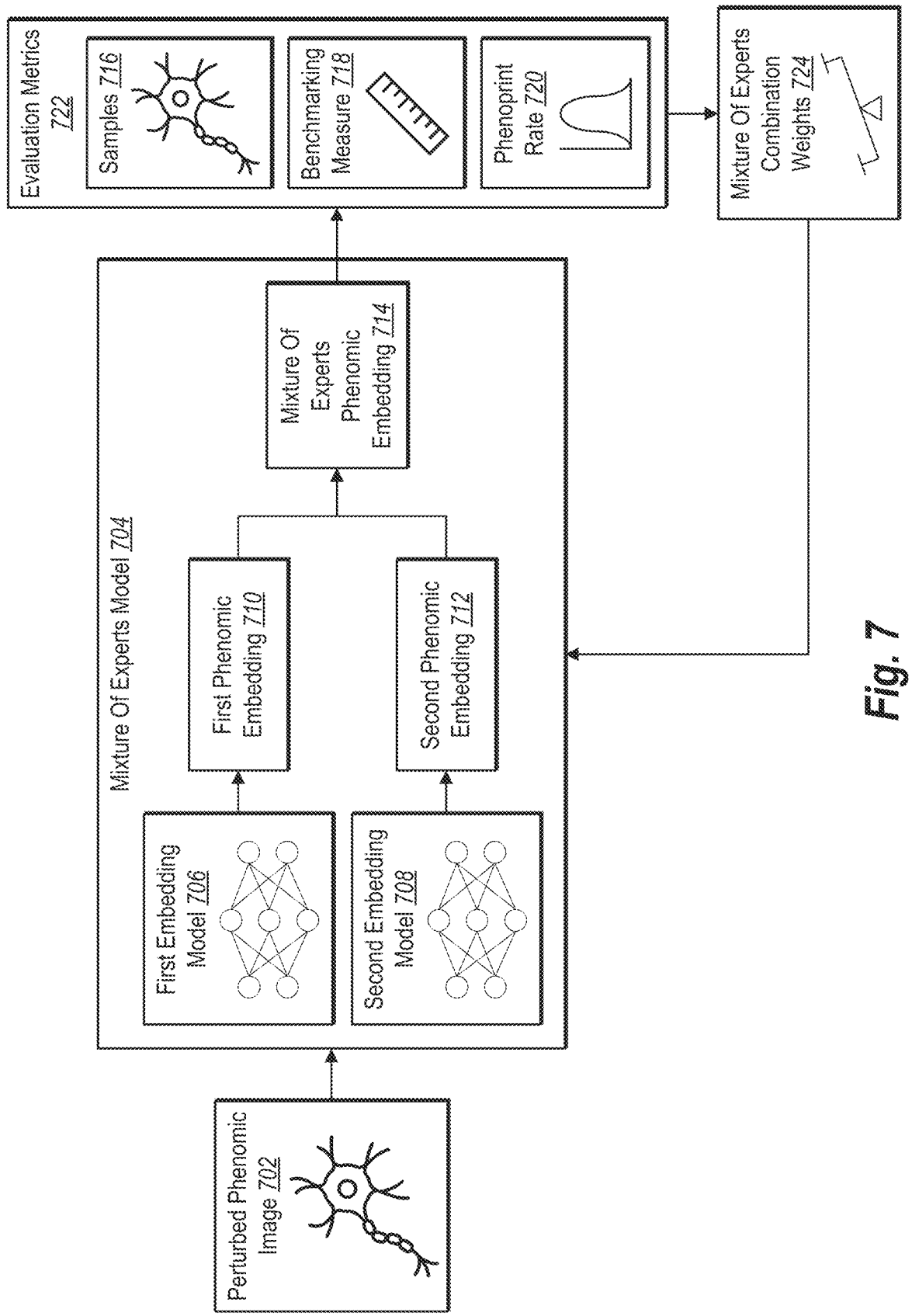
FIG. 7 illustrates a perturbation embedding system 100 determining mixture of experts combination weights from evaluation metrics of a mixture of experts phenomic embedding in accordance with one or more embodiments.

As previously mentioned, the perturbation embedding system 100 can determine mixture of experts combination weights according to evaluation metrics of a mixture of experts phenomic embedding. FIG. 7 illustrates the perturbation embedding system 100 generating a mixture of experts phenomic embedding, determining evaluation metrics for the mixture of experts phenomic embedding, and determining the mixture of experts combination weights according to the evaluation metrics.

As shown in FIG. 7, the perturbation embedding system 100 can use a mixture of experts model 704 to generate a mixture of experts phenomic embedding 714 from a perturbed phenomic image 702. As discussed previously, the perturbation embedding system 100 can use a first embedding model 706 to generate a first phenomic embedding 710 of the perturbed phenomic image 702. Additionally, the perturbation embedding system 100 can use a second embedding model 708 to generate a second phenomic embedding 712 of the perturbed phenomic image 702. Further, the perturbation embedding system 100 can use the mixture of experts model 704 to combine the first phenomic embedding 710 and the second phenomic embedding 712 to generate the mixture of experts phenomic embedding 714.

Based on generating the mixture of experts phenomic embedding 714, the perturbation embedding system 100 can determine evaluation metrics 722 for the mixture of experts phenomic embedding 714. The perturbation embedding system 100 can determine the evaluation metrics 722 at least in part by determining a number of samples 716 the perturbation embedding system 100 used to generate the mixture of experts phenomic embedding 714 (e.g., a first number of samples from the first embedding model 706 and a second number of samples from the second embedding model 708, similar to FIG. 4 as discussed above).

Additionally, the perturbation embedding system 100 can determine the evaluation metrics 722 at least in part by determining a benchmarking measure 718 for the mixture of experts phenomic embedding 714 from the mixture of experts model 704. For example, the perturbation embedding system 100 can determine a predicted bioactivity relationship for a pair of mixture of experts phenomic embeddings. Based on determining the predicted bioactivity relationship, the perturbation embedding system 100 can compare the predicted bioactivity relationship with a benchmark bioactivity database to determine the benchmarking measure 718 for the mixture of experts model 704 that represents a level of accuracy of the perturbation embedding system 100 using the mixture of experts model 704 to generate the mixture of experts phenomic embedding 714 (similar to the discussion above with regard to FIG. 5).

Further, the perturbation embedding system 100 can determine the evaluation metrics 722 at least in part by determining a phenoprint rate 720 of the mixture of experts phenomic embedding 714 (e.g., that reflect a level of accuracy of the mixture of experts model 704). To illustrate, the perturbation embedding system 100 can determine a plurality of statistical significances for a plurality of mixture of experts phenomic embeddings that the perturbation embedding system 100 uses the mixture of experts model 704 to generate. Based on determining the plurality of statistical significances, the perturbation embedding system 100 can compare each of the plurality of statistical significances to a threshold to determine the phenoprint rate 720 for the mixture of experts model 704, similar to the discussion above with regard to FIG. 6.

As illustrated, the perturbation embedding system 100 can use the evaluation metrics 722 to determine or otherwise update mixture of experts combination weights 724 for the mixture of experts model 704, For example, the perturbation embedding system 100 can initially set the mixture of experts combination weights 724 to be 1:1 (e.g., equal weights for the first phenomic embedding 710 from the first embedding model 706 and for the second phenomic embedding 712 from the second embedding model 708). Based on determining the evaluation metrics 722 for the mixture of experts phenomic embedding 714 from the mixture of experts model 704, the perturbation embedding system 100 can adjust or otherwise update the mixture of experts combination weights 724 according to the samples 716, the benchmarking measure 718, and the phenoprint rate 720 of the mixture of experts model 704.

Indeed, as illustrated by the discussion of FIGS. 3-7, the perturbation embedding system 100 can determine or otherwise set the mixture of experts combination weights in a variety of manners. In some embodiments, the perturbation embedding system 100 can determine evaluation metrics (e.g., number of samples, benchmarking measures, and/or phenoprint rates) for individual phenomic embeddings from embedding models and determine the mixture of experts combination weights according to the evaluation metrics for the individual phenomic embeddings. In some embodiments, the perturbation embedding system 100 can determine evaluation metrics (e.g., number of samples, benchmarking measures, and/or phenoprint rates) for a mixture of experts phenomic embedding that is a combination of individual phenomic embeddings (e.g., the perturbation embedding system 100 uses a mixture of experts model to combine the individual phenomic embeddings). Based on determining the evaluation metrics for the mixture of experts phenomic embedding, the perturbation embedding system 100 can set or otherwise modify the mixture of experts combination weights (e.g., parameters of the mixture of experts model) to respectively improve evaluation metrics of subsequent mixture of experts phenomics embeddings.

Figure 8:
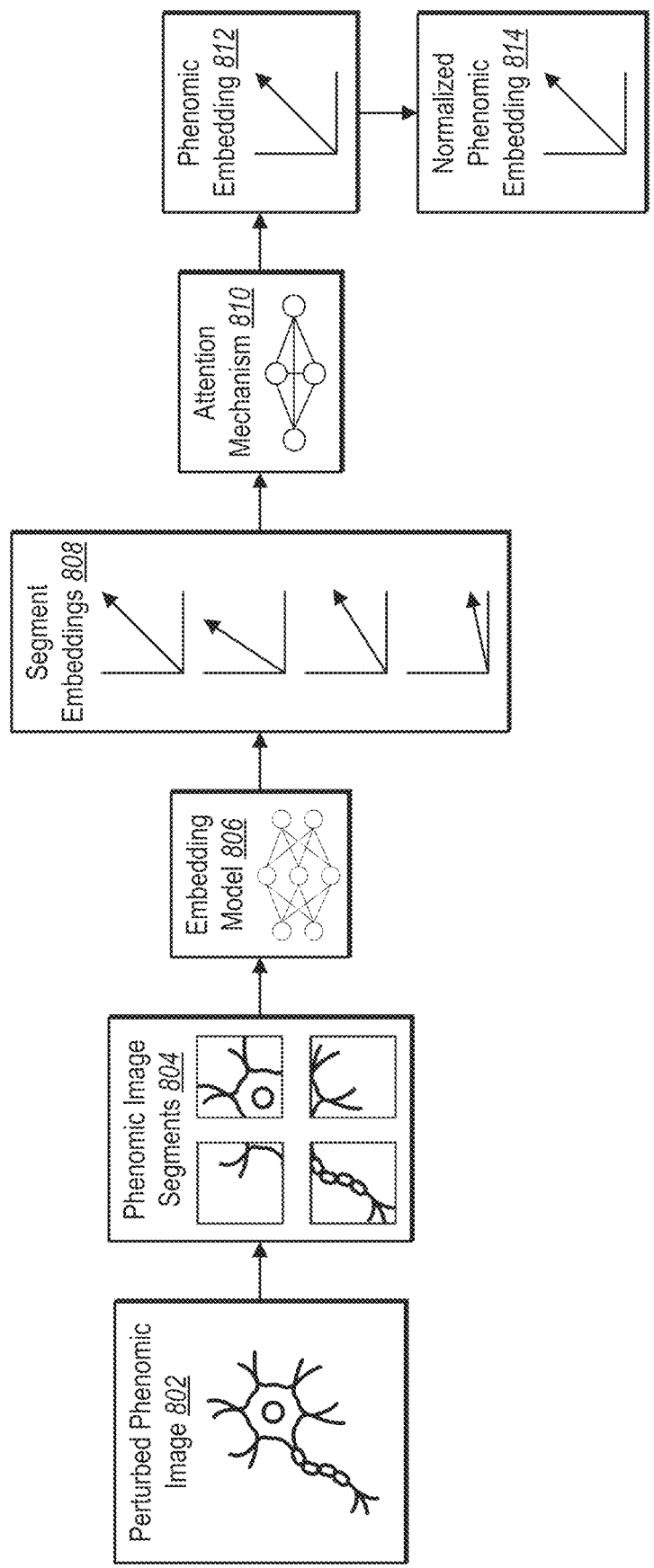
FIG. 8 illustrates a perturbation embedding system utilizing an attention mechanism to aggregate segment embeddings of a perturbed phenomic image in accordance with one or more embodiments.

As previously mentioned, the perturbation embedding system 100 can utilize an attention mechanism to aggregate segment embeddings from an embedding model. FIG. 8 illustrates the perturbation embedding system 100 utilizing an embedding model to generate segment embeddings, utilizing an attention mechanism to aggregate the segment embeddings 808 to generate a phenomic embedding, and generating a normalized phenomic embedding from the phenomic embedding.

As shown in FIG. 8, the perturbation embedding system 100 can generate phenomic image segments 804 from a perturbed phenomic image 802. Indeed, the perturbation embedding system 100 can generate the phenomic image segments 804 according to an image resolution determined for an embedding model 806. To illustrate, the phenomic image segments 804 can each contain a fraction of the perturbed phenomic image 802.

As illustrated, the perturbation embedding system 100 can use the embedding model 806 to generate segment embeddings 808 from the phenomic image segments 804. Further, the perturbation embedding system 100 can use an attention mechanism 810 to aggregate the segment embeddings 808 to generate a phenomic embedding 812. In some embodiments, the attention mechanism 810 can be a component of the embedding model 806 (e.g., the first embedding model and/or the second embedding model can include an attention mechanism). In some embodiments, the attention mechanism 810 can be a component of the perturbation embedding system 100.

For example, the perturbation embedding system 100 can generate or otherwise structure the attention mechanism 810 to include a plurality of layers that analyze, combine, or otherwise modify the segment embeddings. To illustrate, the perturbation embedding system 100 can use a first layer the attention mechanism 810 to perform self-attention tasks to determine the relative importance of each segment embedding of the segment embeddings 808 (e.g., for example by using scaled dot-product attention). For example, the perturbation embedding system 100 can use a plurality of heads the self-attention layer to generate representations for each of the segment embeddings 808 in parallel. Further, the perturbation embedding system 100 can use a second layer of the attention mechanism to stack the representations for each of the segment embeddings 808. In addition, the perturbation embedding system 100 can use a third layer of the attention mechanism 810 to merge the stacked outputs into a single representation, for example using learned weight transformations. Moreover, the perturbation embedding system 100 can use a fourth layer of the attention mechanism 810 to apply feed-forward transformations, such as linear transformations and/or activation functions (e.g., ReLU or GELU) to further refine the combination of segment embeddings to generate the phenomic embedding 812.

To illustrate, the perturbation embedding system 100 can utilize the attention mechanism 810 to weight the segment embeddings 808 such that the phenomic embedding 812 accurately reflects information relating to the perturbation of the perturbed phenomic image 802. For example, the perturbed phenomic image 802 can depict a perturbed neuronal cell. Different segments of the phenomic image segments 804 can depict different aspects of the perturbed neuronal cell. Further, the perturbation depicted in the perturbed phenomic image 802/the phenomic image segments 804 may only affect certain aspects of the morphology of the nerve cell (e.g., the perturbation might target myelin sheaths, nodes of Ranvier, axons, dendrites, somas, synapses, among others). The perturbation embedding system 100 can determine that the affected cell morphology (or other impacts of the perturbation) are depicted in a subset of the phenomic image segments 804. Accordingly, the perturbation embedding system 100 can use the attention mechanism 810 to generate the phenomic embedding by comparing, weighting, merging, refining, and transforming the segment embeddings 808.

As illustrated, the perturbation embedding system 100 can generate a normalized phenomic embedding 814 from the phenomic embedding 812. For example, the perturbation embedding system 100 can determine statistical measures, such as a mean and a standard deviation, for the phenomic embedding 812 and a second phenomic embedding (e.g., the perturbation embedding system 100 can select the phenomic embedding 812 as a first phenomic embedding from a first embedding model and the perturbation embedding system 100 can additionally determine the second phenomic embedding from a second embedding model). Based on determining the mean and the standard deviation for the phenomic embedding and the second phenomic embedding, the perturbation embedding system 100 can generate the normalized phenomic embedding 814 by modifying the phenomic embedding 812 according to the statistical measures (e.g., such as by dividing the phenomic embedding 812 by the standard deviation and subtracting the mean from the phenomic embedding 812). The perturbation embedding system 100 can similarly generate a second normalized phenomic embedding by similarly modifying the second phenomic embedding according to the statistical measures. The perturbation embedding system 100 can then combine the normalized phenomic embedding 814 (e.g., a first normalized phenomic embedding) with the second normalized phenomic embedding according to mixture of experts combination weights to generate a mixture of experts phenomic embedding.

Further, in some embodiments, such as where the phenomic embeddings that the perturbation embedding system 100 uses to generate the mixture of experts phenomic embedding correspond to wells from a same plate (e.g., wells of a same experiment), based on generating a mixture of experts phenomic embedding from at least two normalized phenomic embeddings, the perturbation embedding system 100 can perform covariance whitening on the mixture of experts phenomic embedding to decorrelate features the mixture of experts phenomic embedding and ensure uniform variance of the mixture of experts phenomic embedding. The perturbation embedding system 100 can perform the covariance whitening on the mixture of experts phenomic embedding by performing principal component analysis (PCA) on the mixture of experts phenomic embedding to reduce a dimensionality of the mixture of experts phenomic embedding, such as from 1024 to 256. Based on reducing the dimensionality of the mixture of experts phenomic embedding, the perturbation embedding system 100 can apply a total variation normalization (TVN) algorithm to the mixture of experts phenomic embedding to denoise and harmonize the mixture of experts phenomic embedding.

In some implementations, the perturbation embedding system 100 utilizes a machine learning architecture that includes an adapter model to decompose internal feature representations into vectors that capture significant attributes of interest. To illustrate, the perturbation embedding system 100 utilizes a masked auto-encoder with an adapter architecture that isolates a perturbation feature vector relative to vector representations of background cell features and batch effects. In this manner, during inference, the perturbation embedding system 100 can utilize the masked auto-encoder to generate perturbation embeddings that more accurately and efficiently focus on the effects of perturbations applied to the cell, rather than other background features and batch effects.

Figure 9A:
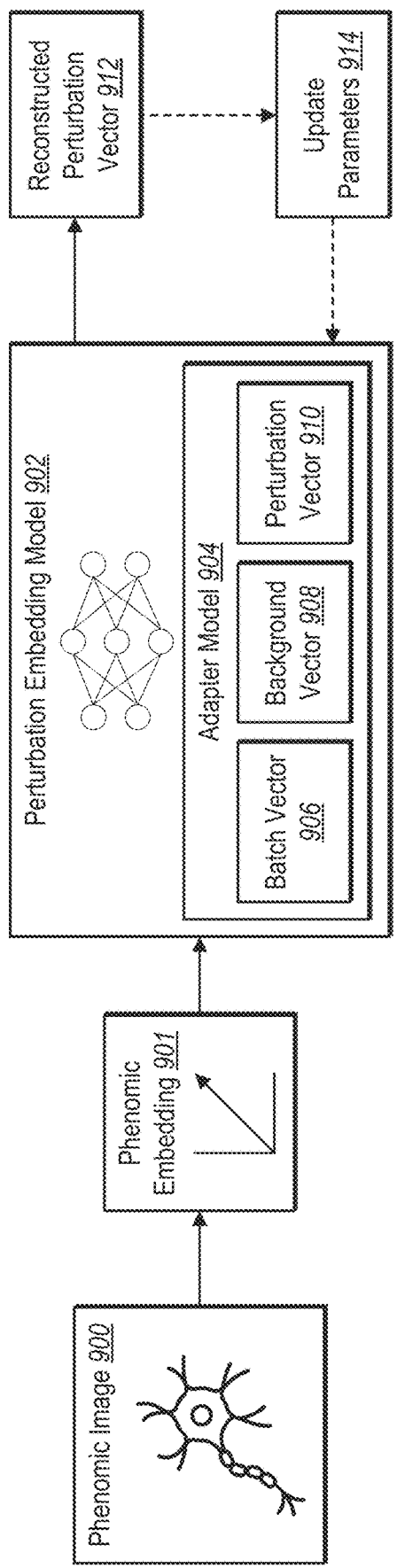
FIG. 9A illustrates a perturbation embedding system training a perturbation embedding model having an adapter in accordance with one or more embodiments.
Figure 9B:
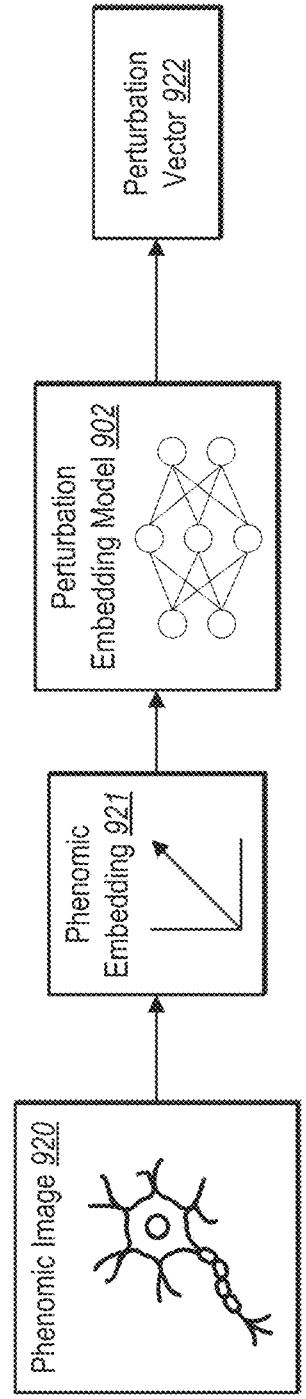
FIG. 9B illustrates the perturbation embedding system utilizing a trained embedding model to generate a perturbation vector in accordance with one or more embodiments.

As just mentioned, in one or more implementations, the perturbation embedding system 100 trains and utilizes a perturbation embedding model with an adapter architecture to generate improved perturbation embeddings of phenomic images. For example, FIG. 9A illustrates the perturbation embedding system 100 training a perturbation embedding model 902 in accordance with one or more embodiments. In addition, FIG. 9B illustrates the perturbation embedding system 100 utilizing the trained perturbation embedding model 902 to generate a perturbation vector/embedding in accordance with one or more embodiments.

Specifically, as illustrated in FIG. 9A, the perturbation embedding system 100 receives a phenomic image 900. In particular, the perturbation embedding system 100 generates, captures, and/or retrieves the phenomic image 900 portraying a cell. To illustrate, the perturbation embedding system 100 can generate a phenomic image by applying a perturbation to a cell, developing the cell, and then capturing a digital image of the cell (e.g., utilizing a microscopy camera). Thus, a phenomic image includes a digital image portraying a cell (e.g., a nerve cell or some other cell type). A phenomic image can also portray a part of a cell, such as, for example, a cell body, an axon, a myelin sheath, a sensory receptor, or a dendrite. Additional detail regarding generating phenomic images is included below (e.g., in relation to FIG. 10).

As shown in FIG. 9A, the perturbation embedding system 100 can generate a phenomic embedding 901 of the phenomic image 900 (e.g., using an embedding model). Based on generating the phenomic embedding 901, the perturbation embedding system 100 can analyze the phenomic embedding 901 utilizing the perturbation embedding model 902 to generate or otherwise extract a reconstructed perturbation vector 912 from the phenomic embedding 901. For example, the perturbation embedding model 902 can include a machine learning model that generates embeddings (e.g., numerical representations or feature vectors) from an input image. As used herein, a "machine learning model" includes a computer algorithm or a collection of computer algorithms that can be trained and/or tuned based on inputs to approximate unknown functions. For example, a machine learning model can include a computer algorithm with branches, weights, or parameters that changed based on training data to improve for a particular task. Thus, a machine learning model can utilize one or more learning techniques to improve in accuracy and/or effectiveness. Example machine learning models include various types of decision trees (e.g., Lightgbm, XGBoost, and Random Forest), support vector machines, Bayesian networks, random forest models, or neural networks (e.g., deep neural networks).

As shown, the perturbation embedding model 902 includes an adapter model 904 that analyzes a batch vector 906, a background vector 908, and a perturbation vector 910 of phenomic embedding 901 to generate the reconstructed perturbation vector 912. To illustrate, the perturbation embedding model 902 generates the perturbation vector 910 from the phenomic embedding 901, a background vector 908 from a background phenomic image, and the batch vector 906 from an image representing one or more experimental batches. The perturbation embedding system 100 utilizes the adapter model 904 to differentiate between the batch vector 906, the background vector 908, and the perturbation vector 910. Thus, upon training, the perturbation embedding model 902 is able to generate perturbation embeddings that more accurately reflect perturbations while diminishing the impact of background and batch effects in the resulting embedding representations. Additional detail regarding the perturbation embedding model 902 and the adapter model 904 is provided below (e.g., in relation to FIG. 10).

As shown in FIG. 9A, the perturbation embedding system 100 also performs an act 914 of updating parameters of the perturbation embedding model 902. For example, the perturbation embedding system 100 can compare the reconstructed perturbation vector 912 with the phenomic embedding 901, and update parameters of the perturbation embedding model based on the comparison (e.g., utilizing a reconstruction loss). The perturbation embedding system 100 can utilize a variety of losses to modify parameters of the perturbation embedding model, including perturbation classification loss, orthogonal projection loss, control loss, various orthogonality losses, and a feature distribution loss. Additional detail regarding the perturbation embedding system 100 updating parameters of the perturbation embedding model 902 is provided below (e.g., in relation to FIG. 10).

In addition to the example embodiment illustrated in FIG. 9A, in one or more implementations, the perturbation embedding system 100 combines multiple machine learning models to generate perturbation embeddings for phenomic digital images. For instance, the perturbation embedding system 100 generates a first phenomic image embedding utilizing a first machine learning model (e.g., a masked auto-encoder) and generates a second phenomic image embedding utilizing a second machine learning model (e.g., a trained classifier machine learning model). The perturbation embedding system 100 can intelligently determine and utilize combination weights to generate a mixture of experts phenomic embedding from the first phenomic image embedding and the second phenomic image embedding. Additional detail regarding the perturbation embedding system 100 generating a mixture of experts phenomic embedding is provided below (e.g., in relation to FIG. 3).

Upon training the perturbation embedding model 902, the perturbation embedding system 100 can utilize the perturbation embedding model 902 to generate perturbation embeddings/vectors from additional embeddings of additional phenomic images. For example, FIG. 9B illustrates the perturbation embedding system 100 generating a perturbation vector 922 from a phenomic embedding 921 of a phenomic image 920 (e.g., a new test phenomic image).

Specifically, the perturbation embedding system 100 can generate, receive, and/or capture the phenomic image 920. For example, the perturbation embedding system 100 can apply a perturbation (e.g., a gene knockout or compound), develop a cell, and capture a digital image of the cell. Based on generating, receiving, and/or capturing the phenomic image 920, the perturbation embedding system 100 can use an embedding model to generate the phenomic embedding 921 of the phenomic image 920.

As shown, the perturbation embedding system 100 analyzes the phenomic embedding 921 utilizing the perturbation embedding model 902. For example, as described in greater detail below, the perturbation embedding system 100 can utilize a trained perturbation encoder (e.g., trained utilizing the perturbation vector 910) to generate the perturbation vector 922. Because the perturbation embedding system 100 trained the perturbation encoder of the perturbation embedding model 902 to generated perturbation vectors that differentiate between background vectors and/or batch vectors, the perturbation vector 922 more accurately captures the unique phenomic effects caused by the cell perturbation (rather than background or batch effects).

The perturbation embedding system 100 can then utilize the perturbation vector 922 for a variety of downstream tasks. For example, the perturbation embedding system 100 can compare the perturbation vector 922 with other perturbation vectors within a machine learning feature space. To illustrate, the perturbation embedding system 100 can determine a similarity metric (e.g., a distance metric or cosine similarity within the feature space) to identify similar or dissimilar perturbation embeddings. The perturbation embedding system 100 can then determine biological interactions based on these similarity metrics. For example, the perturbation embedding system 100 can identify compounds that impact particular genes, compounds with similar biological impacts to other compounds, and/or genes relations and corresponding biological activities.

As just mentioned, in one or more implementations, the perturbation embedding system 100 generates a perturbation embedding using masked auto-encoders and vectors to reduce noise in the phenomic embedding 901. For example, FIG. 10 shows the perturbation embedding system 100 utilizing various encoders and vectors to generate a perturbation embedding.

Figure 10:
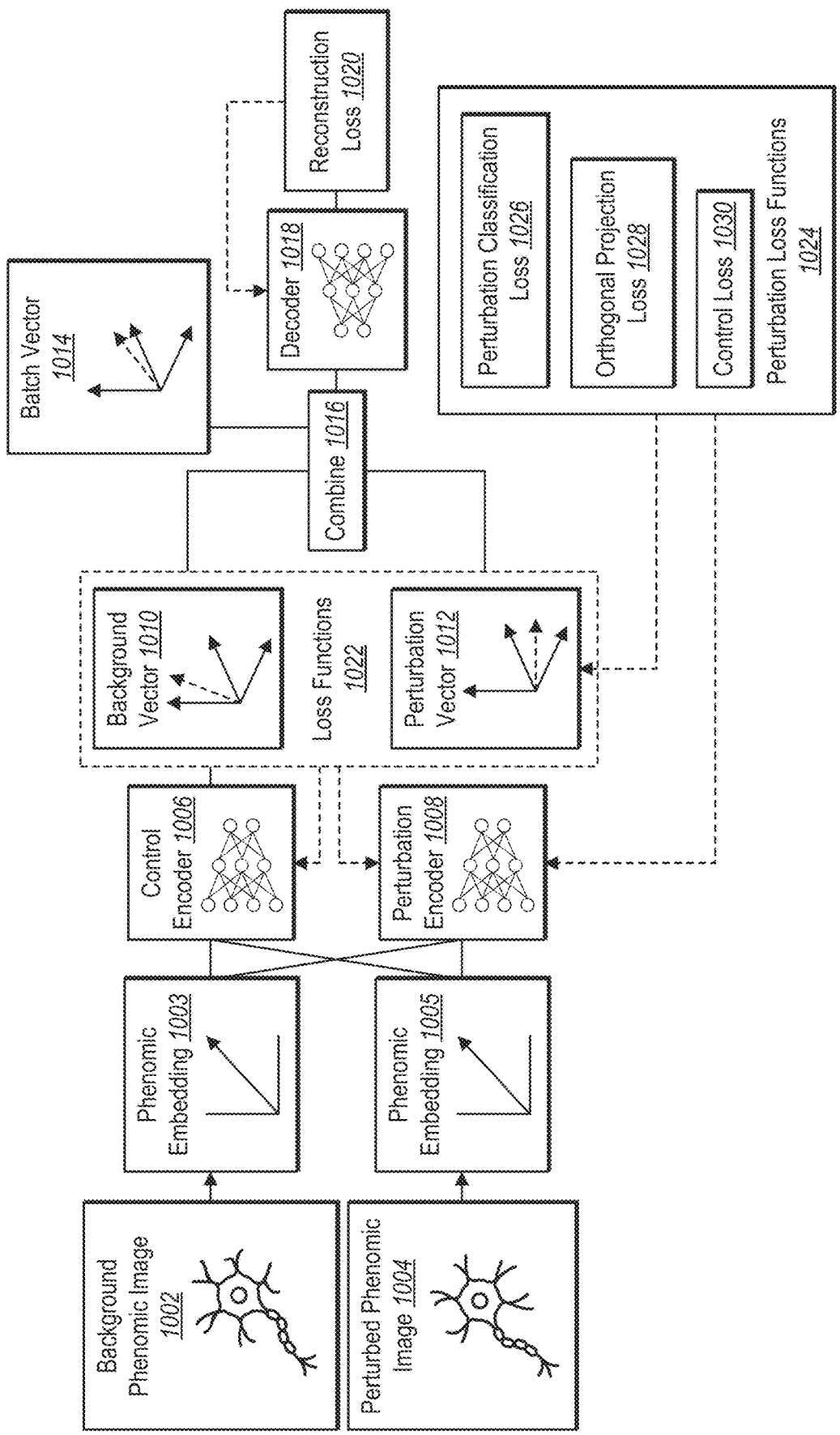
FIG. 10 illustrates an example perturbation embedding system utilizing an adapter model comprising a control encoder and perturbation encoder to generate a perturbation embedding in accordance with one or more embodiments.

As shown in FIG. 10, the perturbation embedding system 100 receives a background phenomic image 1002 and a perturbed phenomic image 1004 as inputs. As used herein, the term "background phenomic image" refers to a phenomic image that portrays a background (e.g., unperturbed) cell. For instance, a background phenomic image includes a digital image of a cell that is not exposed to a particular test perturbation or that does not include an expression of a particular perturbation. Thus, a background phenomic image can include a cell that does not reflect cellular activity and/or genetic expression of a test or query perturbation.

Conversely, as used herein, the term "perturbed phenomic image" refers to phenomic images that portray a perturbed cell. In particular, a perturbed phenomic image includes a digital image of a cell that reflects cellular activity and/or genetic expression related to a query/test perturbation. Thus, in one or more implementations, the perturbation embedding system 100 generates a background phenomic image by developing a cell (e.g., without a perturbation) and utilizing a camera to capture the cell. Moreover, the perturbation embedding system 100 generates a background perturbed phenomic image by applying a perturbation (e.g., applying a CRISPR gene knockout and/or a compound) to a cell, developing the cell, and utilizing a camera to capture the perturbed cell.

As illustrated in FIG. 10, the perturbation embedding system 100 can generate a phenomic embedding 1003 from the background phenomic image 1002 (e.g., such as by using an embedding model). Additionally, the perturbation embedding system 100 can generate a phenomic embedding 1005 from the perturbed phenomic image 1004 (e.g., such as by using an embedding model). Based on generating the phenomic embedding 1003 and the phenomic embedding 1005, the perturbation embedding system 100 can utilize a control encoder 1006 to analyze the phenomic embedding 1003 to generate or otherwise extract a background vector 1010 from the phenomic embedding 1003. Additionally, the perturbation embedding system 100 can utilize the control encoder 1006 to analyze the phenomic embedding 1005. To illustrate, the perturbation embedding system 100 can utilize the control encoder 1006 to create the background vector 1010 and can use the background vector 1010 as a control to differentiate perturbation features reflected in the phenomic embedding 1005.

The control encoder 1006 can include a machine learning model, such as a neural network, that generates a feature vector (e.g., an embedding, encoding, or numerical feature representation) from an input image. For example, the control encoder 1006 can include an input layer, a feature extraction layer, or one or more hidden layers, among others. The perturbation embedding system 100 can utilize the control encoder 1006 to perform one or more functions relating to the analysis of the phenomic embedding 1003 and/or the phenomic embedding 1005, such as feature extraction, dimensionality reduction, learning representations, transfer learning, generative modeling, de-noising, anomaly detection, or regularization, among others.

For example, the control encoder 1006 can be a masked auto-encoder. The perturbation embedding system 100 can utilize the control encoder 1006 to generate a fixed size representation of the inputs received by the perturbation embedding system 100 (e.g., the phenomic embedding 1003 of the background phenomic image 1002 and/or the phenomic embedding 1005 of the perturbed phenomic image 1004).

The perturbation embedding system 100 can utilize the control encoder 1006 to generate a background vector 1010 from the inputs to the control encoder 1006. The perturbation embedding system 100 creates the background vector 1010 to capture the variations that would naturally occur in cell populations (e.g., the perturbation embedding system 100 uses the background vector 1010 to represent cellular variations or activity that are unrelated to the perturbation). Additionally, the perturbation embedding system 100 uses the background vector 1010 to capture cellular effects related to pluripotent stem cell differentiation, such as the donor of the stem cells or the reagents used to facilitate differentiation of the stem cells.

As shown in FIG. 10, the perturbation embedding system 100 can also utilize a perturbation encoder 1008. In particular, as shown the perturbation embedding system 100 can utilize the perturbation encoder 1008 to analyze the phenomic embedding 1005 of the perturbed phenomic image 1004 (and/or the phenomic embedding 1003 of the background phenomic image 1002). The perturbation embedding system 100 can utilize the perturbation encoder 1008 to create or otherwise extract a vector representation from the phenomic embedding 1005 that represents the perturbations applied to the underlying cell portrayed in the perturbed phenomic image 1004.

The perturbation encoder 1008 can include an input layer, a feature extraction layer, or one or more hidden layers, among others. The perturbation embedding system 100 can utilize the perturbation encoder 1008 to perform one or more functions relating to the analysis of the phenomic embedding 1003 and/or the phenomic embedding 1005, such as feature extraction, dimensionality reduction, transfer learning, generative modeling, de-noising, anomaly detection, or regularization, among others.

For example, the perturbation encoder 1008 can be a masked-auto-encoder. The perturbation embedding system 100 can utilize the control encoder 1006 to generate a fixed size representation of the inputs received by the perturbation embedding system 100 (e.g., the phenomic embedding 1003 of the background phenomic image 1002 and/or the phenomic embedding 1005 of the perturbed phenomic image 1004).

The perturbation embedding system 100 can utilize the perturbation encoder 1008 to generate a perturbation vector 1012 from the inputs to the perturbation encoder 1008. The perturbation embedding system 100 creates the perturbation vector 1012 to capture variations in the population of cells that is the result of a perturbation applied by the perturbation embedding system 100 (e.g., the result of a gene knockout, an intervention, or introduction of a compound to the population of cells).

Thus, by utilizing the control encoder 1006 to create the background vector 1010 and the perturbation encoder 1008 to create the perturbation vector 1012, the perturbation embedding system 100 addresses the previously mentioned technical difficulties of lack of accuracy and lack of efficacy in systems not utilizing the perturbation embedding system 100. By creating the background vector 1010, the perturbation embedding system 100 is able to identify and account for several factors that that affect the accuracy and efficacy of conventional systems, such as accounting for naturally present variations in the cell population, as well as how the cell population is affected by pluripotent stem cell differentiation techniques.

As shown, the perturbation embedding system 100 trains the control encoder 1006 and perturbation encoder 1008 to generate differentiated vectors (e.g., the control encoder 1006 and the perturbation vector 1012) utilizing loss functions 1022. For example, the loss functions 1022 can include geometric orthogonality loss, statistical orthogonality loss, or regularization methods to spread out data points in an embedding space.

To illustrate, in some implementations, the perturbation embedding system 100 trains the perturbation embedding model utilizing a geometric orthogonality loss. By utilizing a geometric orthogonality loss, the perturbation embedding system 100 can teach the control encoder 1006 and the perturbation encoder 1008 to generate the perturbation vector 1012 orthogonal to (and independent of) background features reflected in the background vector 1010. The perturbation embedding system 100 can utilize a variety of measures of orthogonality between the perturbation vector 1012 and the background vector 1010 as a geometric orthogonality loss. For example, in some implementations the perturbation embedding system 100 measures geometric orthogonality (e.g., independence) between the background vector 1010 and the perturbation vector 1012 by taking a dot product of the background vector 1010 and the perturbation vector 1012.

In addition, the perturbation embedding system 100 can also utilize a statistical orthogonality loss (e.g., a statistical independent loss to teach the perturbation encoder 1008 and the control encoder 1006 to generate perturbation vectors 1012 that are statistically independent of the background vector 1010). The perturbation embedding system 100 can utilize a variety of statistical independence measures to generate the statistical orthogonality loss. For instance, in some implementations, the perturbation embedding system 100 generates a statistical orthogonality loss by determining the covariance of the background vector 1010 and the perturbation vector 1012.

Moreover, in some embodiments, the perturbation embedding system 100 can apply a space regularization loss. In particular, the perturbation embedding system 100 can apply a space regularization loss to the background vector 1010 and the perturbation vector 1012 to spread out the resulting feature vectors within the features space. The perturbation embedding system 100 can utilize a variety of space regularization measures or approaches for determining the space regularization loss. For example, in some implementations, the perturbation embedding system 100 utilizes a KoLeo loss as the space regularization loss.

As illustrated in FIG. 10, the perturbation embedding system 100 can utilize the losses generated from the loss functions 1022 to update parameters of the control encoder 1006 and the perturbation encoder 1008. For example, the perturbation embedding system 100 can utilize back propagation and/or gradient descent to modify parameters of the control encoder 1006 and/or the perturbation encoder 1008 to reduce/minimize the measures of loss resulting from the loss functions 1022.

As further shown in FIG. 10, the perturbation embedding system 100 can also utilize additional perturbation loss functions 1024 to modify parameters of the perturbation encoder 1008. As illustrated, the perturbation loss functions 1024 can generate a perturbation classification loss 1026, an orthogonal projection loss 1028, and/or a control loss 1030, among others.

For example, the perturbation embedding system 100 can generate the perturbation classification loss 1026 based on a predicted classification generated from the perturbation vector 1012. In particular, the perturbation embedding system 100 can apply a classification model to the perturbation vector 1012 to generate a predicted perturbation classification. The perturbation embedding system 100 then compares the predicted perturbation classification to a ground truth perturbation classification (e.g., utilizing a loss function) to generate the perturbation classification loss 1026.

In one or more implementations, the perturbation embedding system 100 determines the perturbation classification loss 1026 after first applying a normalization to the perturbation vector 1012. For example, the perturbation embedding system 100 generates a normalized vector by determining the L2 norm of the perturbation vector 1012. After creating the normalized vector, the perturbation embedding system 100 applies a perturbation classifier to determine a predicted perturbation classification. By comparing the predicted perturbation classification with the ground truth perturbation (e.g., the actual gene knockout or compound treatment), the perturbation embedding system 100 generates the perturbation classification loss 1026.

In addition, the perturbation embedding system 100 can also impose orthogonality on the perturbation vector 1012 through an orthogonal projection loss 1028 loss. The perturbation embedding system 100 generates the orthogonal projection loss 1028 to encourage inter-class separation and intra-class clustering in the feature space through orthogonality constraints. In particular, the perturbation embedding system 100 enforces separation between features of different class samples (e.g., samples from different perturbation classes) while clustering together features of the same class samples (e.g., samples from the same perturbation classes). For example, in one or more implementations, the perturbation embedding system 100 utilizes the approach described by Kanchana Ranasinghe, et al. in Orthogonal Projection Loss, arXiv:2103.1402 Mar. 25, 2021, which is incorporated by reference herein.

Furthermore, as shown in FIG. 10, the perturbation embedding system 100 generates a control loss 1030. In particular, the perturbation embedding system 100 can impose a loss based on the control (e.g., the background vector 1010). For example, the perturbation embedding system 100 can compare the background vector 1010 and the perturbation vector 1012 to determine the control loss 1030. In some implementations, the perturbation embedding system 100 determines an L2 loss (e.g., mean square error) for controls and utilizes the L2 loss as the control loss 1030 (e.g., to teach the perturbation encoder 1008 to further differentiate the background vector 1010 and the perturbation vector 1012).

The perturbation embedding system 100 utilizes the perturbation classification loss 1026, the orthogonal projection loss 1028, and/or the control loss 1030 to modify parameters of the perturbation encoder 1008. For example, the perturbation embedding system 100 can modify parameters of the perturbation encoder 1008 (e.g., utilizing back propagation and/or gradient descent) to reduce the measures of loss. In this manner, the perturbation embedding system 100 further refines the parameters of the perturbation encoder 1008.

As shown in FIG. 10, the perturbation embedding system 100 also performs an act 1016 of combining the background vector 1010, the perturbation vector 1012, and a batch vector 1014. In some embodiments, the perturbation embedding system 100 combines the background vector 1010 and the perturbation vector 1012 in a first combination operation to generate a combined background-perturbation feature vector. The perturbation embedding system 100 then combines the background-perturbation feature vector with the batch vector 1014 in a second combination operation. In some embodiments, the perturbation embedding system 100 combines the background vector 1010, the perturbation vector 1012, and the batch vector 1014 in a single combination operation. The perturbation embedding system 100 can perform the combination of vectors using a variety of operations, such as, for example, concatenation, elementwise addition, elementwise multiplication, or outer product.

As illustrated, the perturbation embedding system 100 generates and/or access the batch vector 1014. In one or more implementations, the batch vector 1014 includes an embedding or encoding of a batch of cells and/or cell experiments. For example, the perturbation embedding system 100 can capture digital images of cells developed in a batch of cell experiments (or multiple batches). The perturbation embedding system 100 can capture digital images of the cells from the batch (or multiple batches) and utilize a machine learning model to generate an embedding/vector representation of the batch (or multiple batches). For example, the perturbation embedding system 100 can utilize an embedding model to generate a phenomic embedding of each cell in the batch (or multiple batches) and then combine the phenomic embeddings (e.g., add, average, or otherwise combine the embeddings). For example, the perturbation embedding system 100 can utilize an embedding model described in UTILIZING MACHINE LEARNING MODELS TO SYNTHESIZE PERTURBATION DATA TO GENERATE PERTURBATION HEATMAP GRAPHICAL USER INTERFACES, U.S. patent application Ser. No. 18/526,707, filed Dec. 1, 2023 (hereinafter Application '707) or UTILIZING MASKED AUTOENCODER GENERATIVE MODELS TO EXTRACT MICROSCOPY REPRESENTATION AUTOENCODER EMBEDDINGS, U.S. patent application Ser. No. 18/545,399, filed Dec. 19, 2023, which is incorporated herein in its entirety (hereinafter Application '399), which are incorporated by reference herein in their entirety.

In this manner, the perturbation embedding system 100 can capture plating effects on the cells that are unrelated to the perturbation, such as cell adhesion, changes in cell morphology, proliferation rates, differentiation, cell viability, cell signaling, or cell functionality, among others. The perturbation embedding system 100 can create the batch vector 1014 from the same batch as the background phenomic image 1002 or the perturbed phenomic image 1004. In some implementations, the perturbation embedding system 100 generates the batch vector 1014 from other batches (unrelated to the background phenomic image 1002 or the perturbed phenomic image 1004).

After combining the background vector 1010, the perturbation vector 1012, and the batch vector 1014, the perturbation embedding system 100 analyzes the combination of vectors utilizing the decoder 1018. The decoder 1018 can include a neural network with a plurality of layers for generating an output representation from an input embedding. The perturbation embedding system 100 utilizes the decoder 1018 to generate a new representation, such as a digital image. For example, in some implementations, the perturbation embedding system 100 generates a reconstructed perturbation vector (e.g., a reconstructed perturbation embedding) from the phenomic embedding 1005 of the perturbed phenomic image 1004 (or another embedding of another image such as the phenomic embedding 1005 of the background phenomic image 1002).

After extracting the perturbation embedding from the combination of vectors, the perturbation embedding system 100 generates a reconstruction loss 1020. The perturbation embedding system 100 can utilize a variety of reconstruction loss operations, such as, for example, mean squared error (MSE), binary cross entropy, or categorical cross-entropy, among others. After obtaining the reconstruction loss 1020, the perturbation embedding system 100 modifies parameters of the decoder 1018 (e.g., utilizing back propagation to reduce the measure of loss).

In one or more implementations, the control encoder 1006, the perturbation encoder 1008, and the decoder 1018 are implemented as part of a masked auto-encoder architecture as described in Application '399. Thus, although FIG. 10 illustrates the background phenomic image 1002 and the perturbed phenomic image 1004 (in whole), in some implementations, the perturbation embedding system 100 can train the perturbation embedding model by masking and reconstructing one or more input images.

Moreover, although FIG. 10 illustrates a single iteration of training a perturbation embedding model, the perturbation embedding system 100 can iteratively perform one or more operations illustrated in FIG. 10. For example, the perturbation embedding system 100 can iteratively analyze background phenomic images and perturbed phenomic images, generate background vectors and perturbation vectors, generate reconstructed images, and modify parameters of the control encoder 1006, the perturbation encoder 1008, and/or the decoder 1018 utilizing the various losses described herein.

In addition, although FIG. 10 illustrates training a perturbation embedding model, the perturbation embedding system 100 can also apply a trained perturbation embedding model to new perturbed phenomic images. For example, the perturbation embedding model can generate or receive a test perturbed phenomic image and analyze the test perturbed phenomic image utilizing the trained perturbation encoder 1008 to generate a perturbation vector. The perturbation embedding system 100 can then utilize the perturbation vector as a more accurate representation/embedding of the perturbation portrayed in the test perturbed phenomic image. Indeed, the perturbation embedding system 100 can utilize this perturbation vector to compare with other perturbation vectors in identifying new biological interactions or to make biological predictions (e.g., as described in Application '707). For example, the perturbation embedding system 100 can compare phenomic embeddings to generate a map of biology indicating measures of similarity between different perturbations (e.g., compounds and genes).

Figure 11:
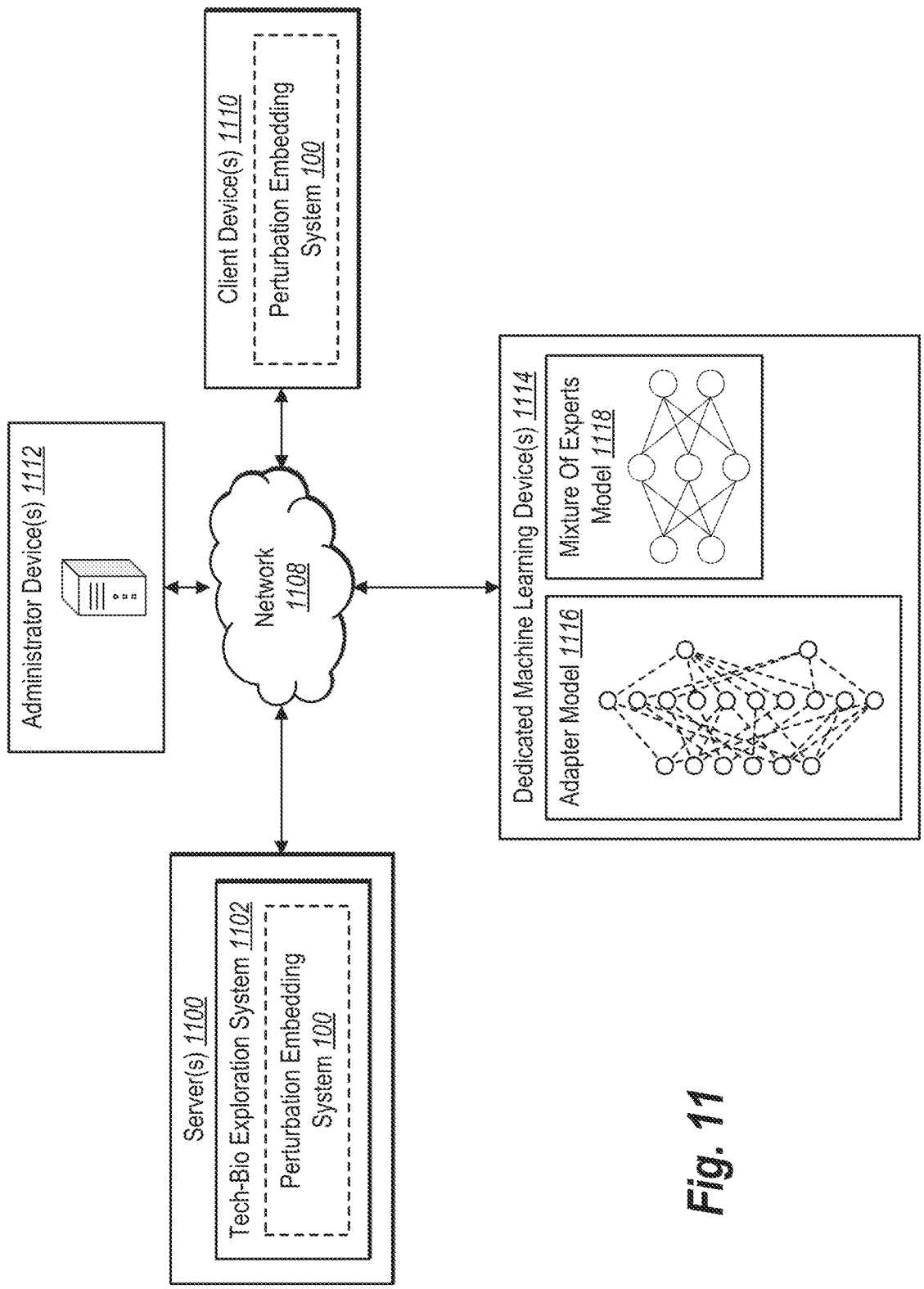
FIG. 11 illustrates an example environment of the perturbation embedding system in accordance with one or more embodiments.

Additional detail regarding the perturbation embedding system 100 environment will now be provided with reference to FIG. 11. In particular, FIG. 11 illustrates a schematic diagram of a system environment in which the perturbation embedding system 100 can operate in accordance with one or more embodiments.

As shown in FIG. 11, the environment includes server(s) 1100 (which includes a tech-bio exploration system 1102 and the perturbation embedding system 100), dedicated machine learning device(s) 1114, a network 1108, client device(s) 1110 and administrator device(s) 1112. As further illustrated in FIG. 11, the various computing devices within the environment can communicate via the network 1108. Although FIG. 11 illustrates the perturbation embedding system 100 being implemented by a particular component and/or device within the environment, the perturbation embedding system 100 can be implemented, in whole or in part, by other computing devices and/or components in the environment (e.g., the additional device(s)). Additional description regarding the illustrated computing devices is provided with respect to FIG. 13 below.

As shown in FIG. 11, the server(s) 1100 (e.g., one or more local servers operated by a particular entity) can include the tech-bio exploration system 1102. In some embodiments, the tech-bio exploration system 1102 can determine, store, generate, and/or display tech-bio information including maps of biology, experiments from various sources, and/or machine learning tech-bio predictions. For instance, the tech-bio exploration system 1102 can analyze data signals corresponding to various treatments or interventions (e.g., compounds or biologics) and the corresponding relationships in genetics, proteomics, phenomics (i.e., cellular phenotypes), and invivomics (e.g., expressions or results within a living animal). Moreover, the tech-bio exploration system 1102 provides an environment for operating, executing, and managing complex drug discovery pipelines.

For instance, the tech-bio exploration system 1102 can generate and access experimental results corresponding to gene sequences, protein shapes/folding, protein/compound interactions, phenotypes resulting from various interventions or perturbations (e.g., gene knockout sequences or compound treatments), and/or in vivo experimentation on various treatments in living animals. By analyzing these signals (e.g., utilizing various machine learning models), the tech-bio exploration system 1102 can generate or determine a variety of predictions and inter-relationships for improving treatments/interventions.

To illustrate, the tech-bio exploration system 1102 can generate maps of biology indicating biological inter-relationships or similarities between these various input signals to discover potential new treatments as part of the complex compound discovery process. For example, the tech-bio exploration system 1102 can utilize machine learning and/or maps of biology to identify a similarity between a first gene associated with disease treatment and a second gene previously unassociated with the disease based on a similarity in resulting phenotypes from gene knockout experiments. The tech-bio exploration system 1102 can then identify new treatments based on the gene similarity (e.g., by targeting compounds the impact the second gene). Similarly, the tech-bio exploration system 1102 can analyze signals from a variety of sources (e.g., protein interactions, or in vivo experiments) to predict efficacious treatments based on various levels of biological data.

The tech-bio exploration system 1102 can generate GUIs comprising dynamic user interface elements to convey tech-bio information and receive user input for intelligently exploring tech-bio information. Indeed, as mentioned above, the tech-bio exploration system 1102 can generate GUIs displaying different maps of biology that intuitively and efficiently express complex interactions between different biological systems for identifying improved treatment solutions. Furthermore, the tech-bio exploration system 1102 can also electronically communicate tech-bio information between various computing devices.

As shown in FIG. 11, the tech-bio exploration system 1102 can include a system that facilitates various models or algorithms for generating maps of biology (e.g., maps or visualizations illustrating similarities or relationships between genes, proteins, diseases, compounds, and/or treatments) and discovering new treatment options over one or more networks. For example, the tech-bio exploration system 1102 collects, manages, and transmits data across a variety of different entities, accounts, and devices. In some cases, the tech-bio exploration system 1102 is a network system that facilitates access to (and analysis of) tech-bio information within a centralized operating system. Indeed, the tech-bio exploration system 1102 can link data from different network-based research institutions to generate and analyze maps of biology.

As shown in FIG. 11, the tech-bio exploration system 1102 can include a system that comprises the perturbation embedding system 100 that generates, stores, manages, transmits data pertaining to perturbations of cells (e.g., gene knockout sequences or compound treatments). For example, in context of the above description for the tech-bio exploration system 1102, in some embodiments the tech-bio exploration system 1102 further utilizes the perturbation embedding system 100 to enhance the coordination between various groups involved in the drug discovery process. For instance, the perturbation embedding system 100 works in tandem with the tech-bio exploration system 1102 to generate perturbation embeddings, transmit the perturbation embeddings to one or more devices, generate bioactivity predictions, and initiate one or more downstream model predictions or processes.

As also illustrated in FIG. 11, the environment includes the client device(s) 1110. As mentioned above, the client device(s) 1110 can be involved in the process of drug discovery. Thus, for example, the client device(s) 1110 can coordinate/manage a first stage of generating a perturbation embedding. Moreover, the client device(s) 1110 can coordinate/manage a second stage such as generating a bioactivity prediction based on the perturbation embedding. Further, the client device(s) 1110 can coordinate/manage a third stage of utilizing the bioactivity prediction to generate one or more additional predictions or initiate one or more programs (IPG or ICG).

To illustrate, the client device(s) 1110 can include computing devices that implement or manage a compound program generation stage of a compound discovery process. Similarly, the client device(s) 1110 can include computing devices that implement or manage a compound lead generation stage and the client device(s) 1110 can include computing devices that implement or manage a compound/dose selection stage. For example, the perturbation embedding system 100 can receive one or more requests to utilize the dedicated machine learning device(s) 1114 to generate one or more perturbation embeddings. For instance, the perturbation embedding system 100 can receive additional requests from the client device(s) 1110 that include generating the bioactivity predictions based at least in part on the perturbation embeddings.

In some embodiments, the environment also includes additional device(s). For example, the perturbation embedding system 100 can utilize the additional device(s) to further operate and manage the completion of complex drug discovery pipelines. For instance, the additional device(s) include experimental device(s) and analytical device(s). Further, in some instances, the additional device(s) also include the computing devices discussed below in FIG. 13.

Furthermore, in one or more implementations, the client device(s) 1110 include a client application. The client application can include instructions that (upon execution) cause the client device(s) 1110 to perform various actions. For example, a user of a user account can interact with the client application on the client device(s) 1110 to execute experiments or other multi-faceted processes and to further access tech-bio information, initiate a request for a generation of a perturbation embedding, or a bioactivity prediction. For instance, in some embodiments the perturbation embedding system 100 receives a request to generate a perturbation embedding, and in response generates the embedding and returns the embedding to the client device(s) 1110. In some instances, the transmittal of the perturbation embedding to the client device(s) 1110 causes the client device(s) 1110 to execute an action (e.g., generate a downstream model prediction).

As shown, the environment can also include dedicated machine learning device(s) 1114. For example, the dedicated machine learning device(s) 1114 can include computing devices or virtual machines dedicated to training or implementing large-scale machine learning models. For example, the dedicated machine learning device(s) 1114 can generate machine learning predictions and/or embeddings based on digital biological data (e.g., digital images of phenotypes resulting from different perturbations or compound-protein interactions from compound features). As shown, the dedicated machine learning device(s) 1114 include an adapter model 1116 and a mixture of experts model 1118. Thus, the perturbation embedding system 100 interacts with the dedicated machine learning device(s) 1114 to generate the perturbation embedding.

The environment can also include experimental device(s). For example, the tech-bio exploration system 1102 can interact with the experimental device(s) that include intelligent robotic devices and camera devices for generating and capturing digital images of cellular phenotypes resulting from different perturbations (e.g., genetic knockouts or compound treatments of stem cells). Similarly, the experimental device(s) can include camera devices and/or other sensors (e.g., heat or motion sensors) capturing real-time information from animals as part of in vivo experimentation. The tech-bio exploration system 1102 can also interact with a variety of other experimental device(s) such as devices for determining, generating, or extracting gene sequences or protein information. For example, the experimental device(s) may include computing devices linked to biosensors electrophysiological platforms, x-ray crystallography machines, liquid chromatography mass spectrometry systems, nuclear magnetic resonance spectrometers, mass spectrometers. In some implementations, the perturbation embedding system 100 generates the perturbation embeddings and further determines to employ or utilize one or more experimental devices (e.g., to initiate one or more experiments based on the perturbation embeddings).

As further shown in FIG. 11, the environment includes the network 1108. As mentioned above, the network 1108 can enable communication between components of the environment. In one or more embodiments, the network 1108 may include a suitable network and may communicate using a various number of communication platforms and technologies suitable for transmitting data and/or communication signals, examples of which are described with reference to FIG. 13. Furthermore, although FIG. 11 illustrates computing devices communicating via the network 1108, the various components of the environment can communicate and/or interact via other methods (e.g., communicate directly).

FIGS. 1-11 the corresponding text, and the examples provide a number of different systems, methods, and non-transitory computer readable media for utilizing a mixture of experts model to generate a mixture of experts phenomap. In addition to the foregoing, embodiments can also be described in terms of flowcharts comprising acts for accomplishing a particular result. For example, FIG. 12 illustrates a flowchart of an example sequence of acts in accordance with one or more embodiments.

Figure 12:
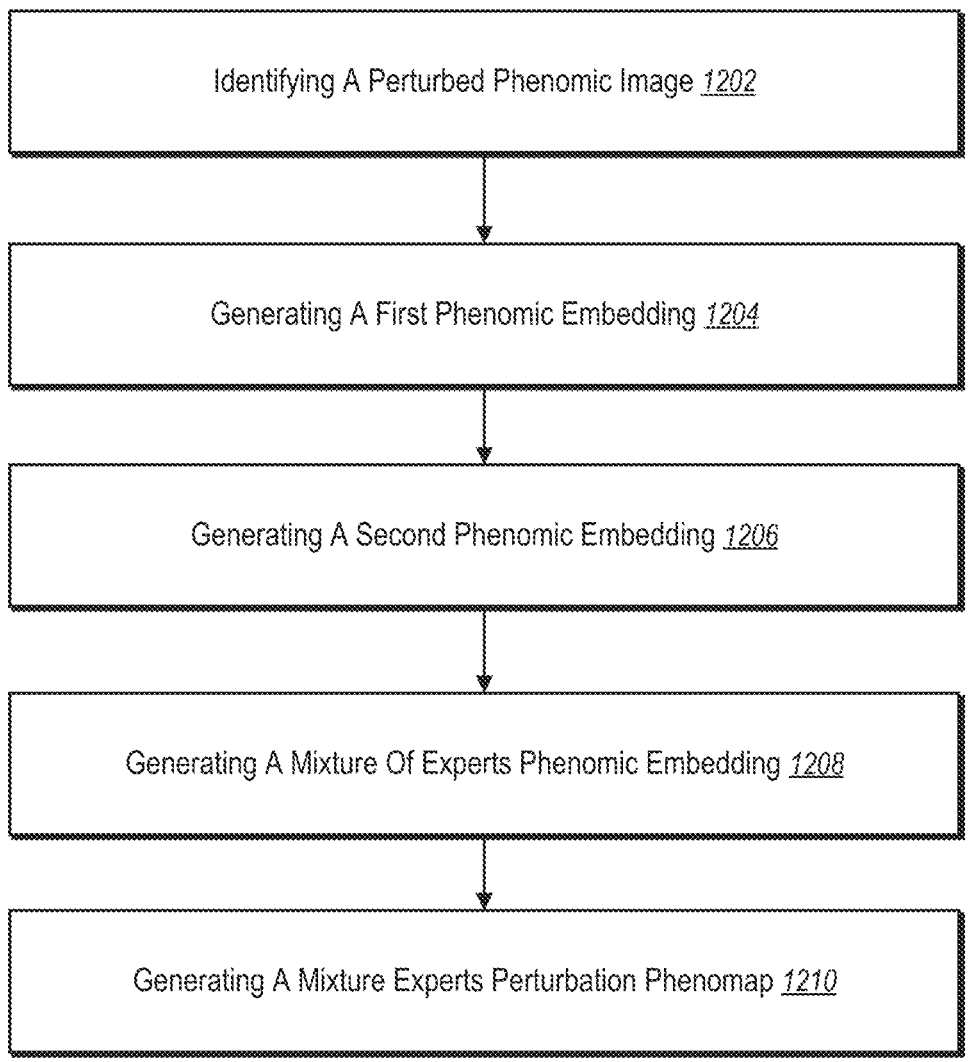
FIG. 12 illustrates an example series of acts to generate a mixture of experts phenomap in accordance with one or more embodiments.

While FIG. 12 illustrate acts according to some embodiments, alternative embodiments may omit, add to, reorder, and/or modify any of the acts shown in FIG. 12. The acts of FIG. 12 can be performed as part of a method (e.g., a computer-implemented method). Alternatively, a non-transitory computer readable medium can comprise instructions, that when executed by one or more processors (e.g., at least one processor), cause a computing device to perform the acts of FIG. 12. In still further embodiments, a system can perform the acts of FIG. 12. Additionally, the acts described herein may be repeated or performed in parallel with one another or in parallel with different instances of the same or other similar acts.

FIG. 12 illustrates an example series of acts 1200 for generating a mixture of experts phenomap in accordance with one or more embodiments. The series of acts 1200 can include an act 1202 of identifying a perturbed phenomic image, an act 1204 of generating a first phenomic embedding, an act 1206 of generating a second phenomic embedding, an act 1208 of generating a mixture of experts phenomic embedding, and an act 1210 of generating a mixture of experts perturbation phenomap.

Specifically the series of acts 1200 can include acts 1102-1110 of: identifying a perturbed phenomic image of a perturbation applied to a cell; generating, utilizing a first embedding model, a first phenomic embedding from the perturbed phenomic image; generating, utilizing a second embedding model, a second phenomic embedding from the perturbed phenomic image; generating a mixture of experts phenomic embedding by combining the first phenomic embedding and the second phenomic embedding utilizing mixture of experts combination weights; and generating a mixture of experts perturbation phenomap by combining the mixture of experts phenomic embedding for the perturbation and at least one additional mixture of experts phenomic embedding for at least one additional perturbation.

Further, in one or more embodiments, the series of acts 1200 can include generating the first phenomic embedding utilizing a masked auto-encoder model trained to generate digital images from masked phenomic images.

Additionally, in some embodiments, the series of acts 1200 can include generating a similarity measure by comparing a pair of phenomic embeddings generated by the first embedding model, wherein the pair of phenomic embeddings correspond to a perturbation pair. Further, the series of acts 1200 can include generating a predicted bioactivity relationship for the perturbation pair based on the similarity measure. In addition, the series of acts 1200 can include generating a benchmarking measure by comparing the predicted bioactivity relationship with a benchmark bioactivity database. Further, the series of acts 1200 can include determining the mixture of experts combination weights according to the benchmarking measure.

Moreover, in one or more embodiments, the series of acts 1200 can include generating the second phenomic embedding utilizing a balanced supervised contrastive learning model trained based on perturbation classification tasks.

Further, in some embodiments, the series of acts 1200 can include determining a phenoprint rate reflecting a rate of statistical significance of a plurality of phenomic embeddings of perturbed phenomic images generated by the second embedding model. Additionally, the series of acts 1200 can include determining the mixture of experts combination weights according to the phenoprint rate.

In addition, in one or more embodiments, the series of acts 1200 can include dividing the perturbed phenomic image into a plurality of phenomic image segments. Further, the series of acts 1200 can include aggregating, by an attention mechanism of the balanced supervised contrastive learning model, the plurality of phenomic image segments to generate the second phenomic embedding.

Moreover, in some embodiments, the series of acts 1200 can include generating a first normalized phenomic embedding from the first phenomic embedding. Additionally, the series of acts 1200 can include generating a second normalized phenomic embedding from the second phenomic embedding. Further, the series of acts 1200 can include combining the first normalized phenomic embedding and the second normalized phenomic embedding utilizing the mixture of experts combination weights.

Additionally, in some embodiments, the series of acts 1200 can include determining a first number of samples used to train the first embedding model. Moreover, the series of acts 1200 can include determining a second number of samples used to train the second embedding model. Further, the series of acts 1200 can include determining the mixture of experts combination weights according to the first number of samples and the second number of samples.

Figure 13:
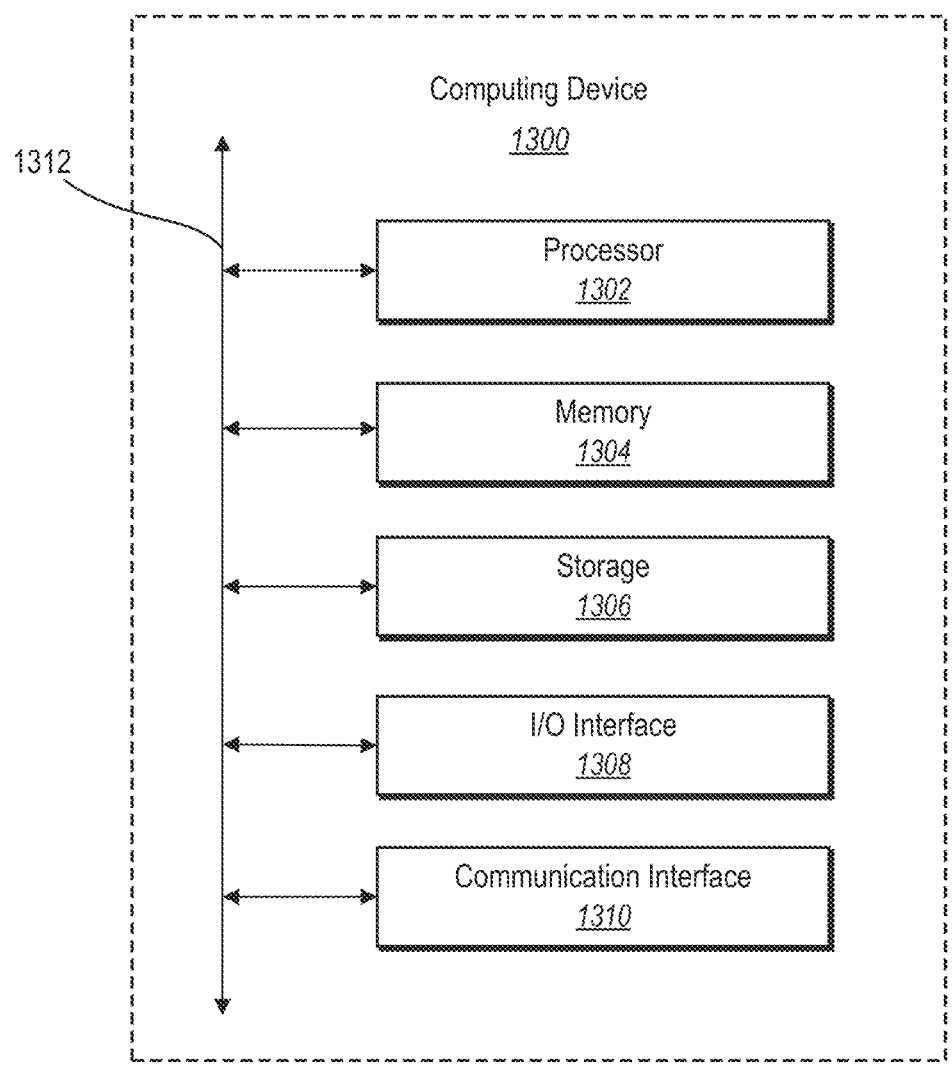
FIG. 13 illustrates a block diagram of a computing device for implementing one or more embodiments.

FIG. 13 illustrates a block diagram of an example computing device 1300 that may be configured to perform one or more of the processes described above. One will appreciate that one or more computing devices, such as the computing device 1300 may represent the computing devices described above. In one or more embodiments, the computing device 1300 may be a mobile device (e.g., a mobile telephone, a smartphone, a PDA, a tablet, a laptop, a camera, a tracker, a watch, a wearable device, etc.). In some embodiments, the computing device 1300 may be a non-mobile device (e.g., a desktop computer or another type of client device). Further, the computing device 1300 may be a server device that includes cloud-based processing and storage capabilities.

As shown in FIG. 13, the computing device 1300 can include one or more processor(s) 1302, memory 1304, a storage device 1306, input/output interfaces 1308 (or "I/O interfaces 1308"), and a communication interface 1310, which may be communicatively coupled by way of a communication infrastructure (e.g., bus 1312). While the computing device 1300 is shown in FIG. 13, the components illustrated in FIG. 13 are not intended to be limiting. Additional or alternative components may be used in other embodiments. Furthermore, in certain embodiments, the computing device 1300 includes fewer components than those shown in FIG. 13. Components of the computing device 1300 shown in FIG. 13 will now be described in additional detail.

In particular embodiments, the processor(s) 1302 includes hardware for executing instructions, such as those making up a computer program. As an example, and not by way of limitation, to execute instructions, the processor(s) 1302 may retrieve (or fetch) the instructions from an internal register, an internal cache, memory 1304, or a storage device 1306 and decode and execute them.

The computing device 1300 includes memory 1304, which is coupled to the processor(s) 1302. The memory 1304 may be used for storing data, metadata, and programs for execution by the processor(s). The memory 1304 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 1304 may be internal or distributed memory.

The computing device 1300 includes a storage device 1306 includes storage for storing data or instructions. As an example, and not by way of limitation, the storage device 1306 can include a non-transitory storage medium described above. The storage device 1306 may include a hard disk drive (HDD), flash memory, a Universal Serial Bus (USB) drive or a combination these or other storage devices.

As shown, the computing device 1300 includes one or more I/O interfaces 1308, which are provided to allow a user to provide input to (such as user strokes), receive output from, and otherwise transfer data to and from the computing device 1300. These I/O interfaces 1308 may include a mouse, keypad or a keyboard, a touch screen, camera, optical scanner, network interface, modem, other known I/O devices or a combination of such I/O interfaces 1308. The touch screen may be activated with a stylus or a finger.

The I/O interfaces 1308 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 1308 are configured to provide graphical data to a display for presentation to a user. The graphical data may be representative of one or more graphical user interfaces and/or any other graphical content as may serve a particular implementation.

The computing device 1300 can further include a communication interface 1310. The communication interface 1310 can include hardware, software, or both. The communication interface 1310 provides one or more interfaces for communication (such as, for example, packet-based communication) between the computing device and one or more other computing devices or one or more networks. As an example, and not by way of limitation, communication interface 1310 may include a network interface controller (NIC) or network adapter for communicating with an Ethernet or other wire-based network or a wireless NIC (WNIC) or wireless adapter for communicating with a wireless network, such as a WI-FI. The computing device 1300 can further include a bus 1312. The bus 1312 can include hardware, software, or both that connects components of computing device 1300 to each other.

In one or more implementations, various computing devices can communicate over a computer network. This disclosure contemplates any suitable network. As an example, and not by way of limitation, one or more portions of a network may include an ad hoc network, an intranet, an extranet, a virtual private network ("VPN"), a local area network ("LAN"), a wireless LAN ("WLAN"), a wide area network ("WAN"), a wireless WAN ("WWAN"), a metropolitan area network ("MAN"), a portion of the Internet, a portion of the Public Switched Telephone Network ("PSTN"), a cellular telephone network, or a combination of two or more of these.

In particular embodiments, the computing device 1300 can include a client device that includes a requester application or a web browser, such as MICROSOFT INTERNET EXPLORER, GOOGLE CHROME, or MOZILLA FIREFOX, and may have one or more add-ons, plug-ins, or other extensions, such as TOOLBAR or YAHOO TOOLBAR. A user at the client device may enter a Uniform Resource Locator ("URL") or other address directing the web browser to a particular server (such as server), and the web browser may generate a Hyper Text Transfer Protocol ("HTTP") request and communicate the HTTP request to server. The server may accept the HTTP request and communicate to the client device one or more Hyper Text Markup Language ("HTML") files responsive to the HTTP request. The client device may render a webpage based on the HTML files from the server for presentation to the user. This disclosure contemplates any suitable webpage files. As an example, and not by way of limitation, webpages may render from HTML files, Extensible Hyper Text Markup Language ("XHTML") files, or Extensible Markup Language ("XML") files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, the tech-bio exploration system 1102 may include a variety of servers, sub-systems, programs, modules, logs, and data stores. In particular embodiments, the tech-bio exploration system 1102 may include one or more of the following: a web server, action logger, API-request server, transaction engine, cross-institution network interface manager, notification controller, action log, third-party-content-object-exposure log, inference module, authorization/privacy server, search module, user-interface module, user-profile (e.g., provider profile or requester profile) store, connection store, third-party content store, or location store. The tech-bio exploration system 1102 may also include suitable components such as network interfaces, security mechanisms, load balancers, failover servers, management-and-network-operations consoles, other suitable components, or any suitable combination thereof. In particular embodiments, the tech-bio exploration system 1102 may include one or more user-profile stores for storing user profiles and/or account information for credit accounts, secured accounts, secondary accounts, and other affiliated financial networking system accounts. A user profile may include, for example, biographic information, demographic information, financial information, behavioral information, social information, or other types of descriptive information, such as interests, affinities, or location.

The web server may include a mail server or other messaging functionality for receiving and routing messages between the tech-bio exploration system 1102 and one or more client devices. An action logger may be used to receive communications from a web server about a user's actions on or off the tech-bio exploration system 1102. In conjunction with the action log, a third-party-content-object log may be maintained of user exposures to third-party-content objects. A notification controller may provide information regarding content objects to a client device. Information may be pushed to a client device as notifications, or information may be pulled from a client device responsive to a request received from the client device. Authorization servers may be used to enforce one or more privacy settings of the users of the tech-bio exploration system 1102. A privacy setting of a user determines how particular information associated with a user can be shared. The authorization server may allow users to opt in to or opt out of having their actions logged by the tech-bio exploration system 1102 or shared with other systems, such as, for example, by setting appropriate privacy settings. Third-party-content-object stores may be used to store content objects received from third parties. Location stores may be used for storing location information received from a client device associated with users.

In the foregoing specification, the invention has been described with reference to specific example embodiments thereof. Various embodiments and aspects of the invention (s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A computer-implemented method comprising:
   identifying a perturbed phenomic image of a perturbation applied to a cell;
   generating, utilizing a first embedding model, a first phenomic embedding from the perturbed phenomic image;
   generating, utilizing a second embedding model, a second phenomic embedding from the perturbed phenomic image;
   generating a mixture of experts phenomic embedding by combining the first phenomic embedding and the second phenomic embedding utilizing mixture of experts combination weights; and
   generating a mixture of experts perturbation phenomap by combining the mixture of experts phenomic embedding for the perturbation and at least one additional mixture of experts phenomic embedding for at least one additional perturbation.

2. The computer-implemented method of claim 1, wherein generating, utilizing the first embedding model, the first phenomic embedding further comprises generating the first phenomic embedding utilizing a masked auto-encoder model trained to generate digital images from masked phenomic images.

3. The computer-implemented method of claim 1, further comprising:
   generating a similarity measure by comparing a pair of phenomic embeddings generated by the first embedding model, wherein the pair of phenomic embeddings correspond to a perturbation pair;
   generating a predicted bioactivity relationship for the perturbation pair based on the similarity measure;
   generating a benchmarking measure by comparing the predicted bioactivity relationship with a benchmark bioactivity database; and
   determining the mixture of experts combination weights according to the benchmarking measure.

4. The computer-implemented method of claim 1, wherein generating, utilizing the second embedding model, the second phenomic embedding further comprises generating the second phenomic embedding utilizing a balanced supervised contrastive learning model trained based on perturbation classification tasks.

5. The computer-implemented method of claim 4, further comprising:
   determining a phenoprint rate reflecting a rate of statistical significance of a plurality of phenomic embeddings of perturbed phenomic images generated by the second embedding model; and
   determining the mixture of experts combination weights according to the phenoprint rate.

6. The computer-implemented method of claim 4, further comprising:
   dividing the perturbed phenomic image into a plurality of phenomic image segments; and
   aggregating, by an attention mechanism of the balanced supervised contrastive learning model, the plurality of phenomic image segments to generate the second phenomic embedding.

7. The computer-implemented method of claim 1, further comprising comparing the mixture of experts phenomic embedding with the at least one additional mixture of experts phenomic embedding to generate a perturbation similarity measure between the perturbation and the at least one additional perturbation.

8. The computer-implemented method of claim 1, wherein generating the mixture of experts phenomic embedding by:
   generating a first normalized phenomic embedding from the first phenomic embedding;
   generating a second normalized phenomic embedding from the second phenomic embedding; and
   combining the first normalized phenomic embedding and the second normalized phenomic embedding utilizing the mixture of experts combination weights.

9. The computer-implemented method of claim 1, further comprising:
   determining a first number of samples used to train the first embedding model;
   determining a second number of samples used to train the second embedding model; and
   determining the mixture of experts combination weights according to the first number of samples and the second number of samples.

10. A system comprising:
    at least one processor; and
    at least one non-transitory computer-readable storage medium storing instructions that, when executed by the at least one processor, cause the system to:
    identify a perturbed phenomic image of a perturbation applied to a cell;
    generate, utilizing a first embedding model, a first phenomic embedding from the perturbed phenomic image;
    generate, utilizing a second embedding model, a second phenomic embedding from the perturbed phenomic image;
    generate a mixture of experts phenomic embedding by combining the first phenomic embedding and the second phenomic embedding utilizing mixture of experts combination weights; and
    generate a mixture of experts perturbation phenomap by combining the mixture of experts phenomic embedding for the perturbation and at least one additional mixture of experts phenomic embedding for at least one additional perturbation.

11. The system of claim 10, further comprising instructions that, when executed by the at least one processor, cause the system to generate, utilizing the first embedding model, the first phenomic embedding by generating the first phenomic embedding utilizing a masked auto-encoder model trained to generate digital images from masked phenomic images.

12. The system of claim 10, further comprising instructions that, when executed by the at least one processor, cause the system to:
    generate a similarity measure by comparing a pair of phenomic embeddings generated by the first embedding model, wherein the pair of phenomic embeddings correspond to a perturbation pair;
    generate a predicted bioactivity relationship for the perturbation pair based on the similarity measure;
    generate a benchmarking measure by comparing the predicted bioactivity relationship with a benchmark bioactivity database; and
    determine the mixture of experts combination weights according to the benchmarking measure.

13. The system of claim 10, further comprising instructions that, when executed by the at least one processor, cause the system to generate, utilizing the second embedding model, the second phenomic embedding by generating the second phenomic embedding utilizing a balanced supervised contrastive learning model trained based on perturbation classification tasks.

14. The system of claim 13, further comprising instructions that, when executed by the at least one processor, cause the system to:
    determine a phenoprint rate reflecting a rate of statistical significance of a plurality of phenomic embeddings of perturbed phenomic images generated by the second embedding model; and
    determine the mixture of experts combination weights according to the phenoprint rate.

15. The system of claim 13, further comprising further comprising instructions that, when executed by the at least one processor, cause the system to:
    divide the perturbed phenomic image into a plurality of phenomic image segments; and
    aggregate, by an attention mechanism of the balanced supervised contrastive learning model, the plurality of phenomic image segments to generate the second phenomic embedding.

16. A non-transitory computer-readable medium storing instructions that, when executed by at least one processor, cause a computing device to:
    identify a perturbed phenomic image of a perturbation applied to a cell;
    generate, utilizing a first embedding model, a first phenomic embedding from the perturbed phenomic image;

generate, utilizing a second embedding model, a second phenomic embedding from the perturbed phenomic image;

generate a mixture of experts phenomic embedding by combining the first phenomic embedding and the second phenomic embedding utilizing mixture of experts combination weights; and generate a mixture of experts perturbation phenomap by combining the mixture of experts phenomic embedding for the perturbation and at least one additional mixture of experts phenomic embedding for at least one additional perturbation.

17. The non-transitory computer-readable medium of claim 16, further comprising instructions that, when executed by the at least one processor, cause the computing device to generate, utilizing the first embedding model, the first phenomic embedding by generating the first phenomic embedding utilizing a masked auto-encoder model trained to generate digital images from masked phenomic images.

18. The non-transitory computer-readable medium of claim 16, further comprising instructions that, when executed by the at least one processor, cause the computing device to:

generate a similarity measure by comparing a pair of phenomic embeddings generated by the first embedding model, wherein the pair of phenomic embeddings correspond to a perturbation pair;

generate a predicted bioactivity relationship for the perturbation pair based on the similarity measure;

generate a benchmarking measure by comparing the predicted bioactivity relationship with a benchmark bioactivity database; and determine the mixture of experts combination weights according to the benchmarking measure.

19. The non-transitory computer-readable medium of claim 16, further comprising instructions that, when executed by the at least one processor, cause the computing device to generate, utilizing the second embedding model, the second phenomic embedding by generating the second phenomic embedding utilizing a balanced supervised contrastive learning model trained based on perturbation classification tasks.

20. The non-transitory computer-readable medium of claim 19, further comprising instructions that, when executed by the at least one processor, cause the computing device to:

determine a phenoprint rate reflecting a rate of statistical significance of a plurality of phenomic embeddings of perturbed phenomic images generated by the second embedding model; and determine the mixture of experts combination weights according to the phenoprint rate.

* * * * *